United States Patent
Colonna et al.

(10) Patent No.: US 9,955,299 B2
(45) Date of Patent: Apr. 24, 2018

(54) METHOD AND SYSTEM FOR A POSTERIORI COMPUTATION OF ORIGIN-DESTINATION MATRICES RELATING TO GATHERING OF PEOPLE THROUGH ANALYSIS OF MOBILE COMMUNICATION NETWORK DATA

(71) Applicant: TELECOM ITALIA S.p.A., Milan (IT)

(72) Inventors: Massimo Colonna, Turin (IT); Marco Mamei, Reggio Emilia (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/540,732

(22) PCT Filed: Dec. 30, 2014

(86) PCT No.: PCT/EP2014/079432
§ 371 (c)(1),
(2) Date: Jun. 29, 2017

(87) PCT Pub. No.: WO2016/107645
PCT Pub. Date: Jul. 7, 2016

(65) Prior Publication Data
US 2017/0353831 A1    Dec. 7, 2017

(51) Int. Cl.
*H04W 24/00*    (2009.01)
*H04W 4/02*    (2018.01)
*H04W 84/04*    (2009.01)

(52) U.S. Cl.
CPC ............ *H04W 4/022* (2013.01); *H04W 4/028* (2013.01); *H04W 84/042* (2013.01)

(58) Field of Classification Search
CPC .... H04W 4/022; H04W 84/042; H04W 4/028
See application file for complete search history.

(56) References Cited

U.S. PATENT DOCUMENTS

| | | | |
|---|---|---|---|
| 2002/0183077 A1* | 12/2002 | Fomukong | B60R 25/102 455/456.1 |
| 2010/0197318 A1* | 8/2010 | Petersen | G06Q 10/10 455/456.1 |
| 2013/0225196 A1 | 8/2013 | James et al. | |
| 2014/0045529 A1* | 2/2014 | Bolon | H04W 4/028 455/456.1 |

OTHER PUBLICATIONS

F. Calabrese, et al., "Estimating Origin-Destination Flows Using Mobile Phone Location Data," Pervasive Computing, 2011, pp. 36-44, XP 11385665A.

(Continued)

*Primary Examiner* — Chuong A Ngo
(74) *Attorney, Agent, or Firm* — Oblon, McClelland, Maier & Neustadt, L.L.P.

(57) ABSTRACT

A method is provided for estimating flows of persons that gathered at an Area of Interest for attending a public happening during a time interval on a day. The Area of Interest is defined by an Area of Interest center and an Area of Interest radius and is covered by a mobile telecommunication network having a plurality of communication stations (105a) each of which is adapted to manage communications of user equipment in one or more served areas in which the mobile telecommunication network is subdivided.

20 Claims, 18 Drawing Sheets

(56) References Cited

OTHER PUBLICATIONS

F. Calabrese, et al., "Real-Time Urban Monitoring Using Cell Phones: A Case Study in Rome," IEEE Transactions on Intelligent Transportation Systems, vol. 12, No. 1, Mar. 2011, pp. 141-151, XP 11348833A.
F. Calabrese, et al., "The Geography of Taste: Analyzing Cell-Phone Mobility and Social Events," Pervasive 2010, LNCS 6030, 2010, pp. 22-37, XP 19141609A.
International Search Report dated Sep. 2, 2015 in PCT/EP2014/079432 filed Dec. 30, 2014.

\* cited by examiner

| | $z_1$ | $z_2$ | ... | $z_i$ | ... | $z_8$ | $z_9$ |
|---|---|---|---|---|---|---|---|
| $z_1$ | od(1,1) | od(2,1) | ... | od(i,1) | ... | od(8,1) | od(9,1) |
| $z_2$ | od(1,2) | od(2,2) | | od(i,2) | | od(8,2) | od(9,2) |
| ⋮ | | | | ⋮ | | | |
| $z_j$ | od(1,j) | od(2,j) | ... | od(i,j) | ... | od(8,j) | od(9,j) |
| ⋮ | | | | ⋮ | | | |
| $z_8$ | od(1,8) | od(2,8) | | od(i,8) | | od(8,8) | od(9,8) |
| $z_9$ | od(1,9) | od(2,9) | ... | od(i,9) | ... | od(8,9) | od(9,9) |

FIG.6

METHOD AND SYSTEM FOR A POSTERIORI COMPUTATION OF ORIGIN-DESTINATION MATRICES RELATING TO GATHERING OF PEOPLE THROUGH ANALYSIS OF MOBILE COMMUNICATION NETWORK DATA

BACKGROUND OF THE INVENTION

Field of the Invention

Traffic analysis is aimed at identifying and predicting variations in the flow (e.g., people flow, vehicular traffic flow) of physical entities (e.g., people, land vehicles) moving in a geographic region of interest (e.g., a urban area) and over a predetermined observation period (e.g., a 24 hours observation period).

A typical, but not limitative, example of traffic analysis is represented by the analysis of vehicular (cars, trucks, etc.) traffic flow over the routes of a geographic region of interest, or simply Region of Interest (RoI for short). Such analysis allows achieving a more efficient planning of the transportation infrastructure within the Region of Interest and also it allows predicting how changes in the transportation infrastructure, such as for example closure of roads, changes in a sequencing of traffic lights, construction of new roads and new buildings, can impact on the vehicular traffic.

In the following for traffic analysis it is inTended the analysis of the movements of physical entities through a geographic area. Such physical entities can be vehicles (e.g., cars, trucks, motorcycles, public transportation buses) and/or individuals.

Since it is based on statistical calculations, traffic analysis needs a large amount of empirical data to be collected in respect of the Region of Interest and the selected observation period, in order to provide accurate results. In order to perform the analysis of traffic, the collected empirical data are then usually arranged in a plurality of matrices, known in the art as Origin-Destination (O-D) matrices. The O-D matrices are based upon a partitioning of both the Region of Interest and the observation period.

For partitioning the Region of Interest, the area is subdivided into a plurality of zones, each zone being defined according to several parameters such as for example, authorities in charge of the administration of the zones (e.g., a municipality), typology of land lots in the Region of Interest (such as open space, residential, agricultural, commercial or industrial lots) and physical barriers (e.g., rivers) that can hinder traffic (physical barriers can be used as zone boundaries). The size of the zones in which the Region of Interest can be subdivided, and consequently the number of zones, is proportional to the level of detail requested for the traffic analysis (i.e., city districts level, city level, regional level, state level, etc.).

As well, the observation period can be subdivided into one or more time slots, each time slot may be defined according to known traffic trends, such as for example peak traffic hours corresponding to when most commuters travel to their workplace and/or travel back home. The length of the time slots (and thus their number) is proportional to the level of detail requested for the traffic analysis over the considered observation period.

Each entry of a generic O-D matrix comprises the number of physical entities moving from a first zone (origin) to a second zone (destination) of the area of interest. Each O-D matrix corresponds to one time slot out of the one or more time slots in which the considered observation period can be subdivided. In order to obtain a reliable traffic analysis, sets of O-D matrices should be computed over a plurality of analogous observation periods and should be combined so as to obtain O-D matrices with a higher statistical value. For example, empirical data regarding the movements of physical entities should be collected over a number of (consecutive or not) days (each corresponding to a different observation period), and for each day a corresponding set of O-D matrices should be computed.

O-D matrices that results to be particularly useful are O-D matrices build with respect to the formation of "crowds" i.e., a gathering of a certain number of people, gathered in a certain location for, e.g., for attending at public events or happenings, public happenings of the most disparate nature, like for example (and non-exhaustively) live television shows, artistic/entertaining performances, cultural exhibitions, theatrical plays, sports contests, concerts, movies, demonstrations and so forth.

In the tasks of urban planning, management of activities (e.g., transport systems management and emergencies management), and tourism and local marketing, it is useful to have a knowledge of the how and when people moved for gathering at certain locations or Areas of Interests (AoI for short, e.g., a building, such as for example a stadium or a theatre or a cinema, the surroundings thereof, a square or a street(s) of a city or town or village, a district etc., generally smaller than the Region of Interest), e.g. because they attended public happenings like shows or events (e.g., related to culture, entertaining, politics or sports) that took place within the Area of Interest.

In fact, this knowledge allows building O-D matrices referred to persons that have attended to public happenings, which allows an insight of mobility issues and more effective planning of subsequent public happenings of the same type. Particularly, this knowledge allows a more effective planning and managing of resources and activities (such as infrastructures, transport system and security) directly or indirectly related to similar public happenings that may take place in the future (such as for example sports matches that regularly take place at a stadium). Moreover, from a commercial viewpoint, this knowledge allows a better management of marketing activities inTended to promote similar events that may take place in the future.

Overview of the Related Art

A typical method for collecting empirical data used to compute O-D matrices related to a specific Region of Interest is based on submitting questionnaires to, or performing interviews with inhabitants of the Region of Interest and/or to inhabitants of the neighboring areas about their habits in relation to their movements, and/or by installing vehicle count stations along routes of the area of interest for counting the number of vehicles moving along such routes. The Applicant has observed that this method has very high costs and it requires a long time for collecting a sufficient amount of empirical data. Due to this, O-D matrices used to perform traffic analysis are built seldom, possibly every several years, and become out-of-date.

In the art, several alternative solutions have been proposed for collecting empirical data used to compute O-D matrices.

For example, U.S. Pat. No. 5,402,117 discloses a method for collecting mobility data in which, via a cellular radio communication system, measured values are transmitted from vehicles to a computer. The measured values are chosen so that they can be used to determine O-D matrices without infringing upon the privacy of the users.

In Chinese PaTent Application No. 102013159 a number plate identification databased area dynamic origin and destination (OD) data acquiring method is described. The dynamic OD data is the dynamic origin and destination data, wherein O represents origin and D represents destination. The method comprises the steps of: dividing OD areas according to requirements, wherein the minimum time unit is 5 minutes; uniformly processing data of each intersection in the area every 15 minutes by a traffic control center; detecting number plate data; packing the number plate identification data; uploading the number plate identification data to the traffic control center; comparing a plate number with an identity (ID) number passing through the intersections; acquiring the time of each vehicle passing through each intersection; acquiring the number of each intersection in the path through which each vehicle passes from the O point to the D point by taking the plate number as a clue; sequencing the intersections according to time sequence and according to the number of the vehicles which pass through between the nodes calculating a dynamic OD data matrix.

WO 2007/031370 relates to a method for automatically acquiring traffic inquiry data, e.g. in the form of an O-D matrix, especially as input information for traffic control systems. The traffic inquiry data are collected by means of radio devices placed along the available routes.

Nowadays, mobile phones have reached a thorough diffusion among the population of many countries, and mobile phone owners almost always carry their mobile phone with them. Since mobile phones communicate with a plurality of base stations of the mobile phone networks, and each base station operates over a predetermined geographic area (or cell) which is known to the mobile phone network, mobile phones result to be optimal candidates as tracking devices for collecting data useful for performing traffic analysis. For example, N. Caceres, J. Wideberg, and F. Benitez "Deriving origin destination data from a mobile phone network", Intelligent Transport Systems, IET, vol. 1, no. 1, pp. 15-26, 2007, describes a mobility analysis simulation of moving vehicles along a highway covered by a plurality of GSM network cells. In the simulation the entries of O-D matrices are determined by identifying the GSM cells used by the mobile phones in the moving vehicles for establishing voice calls or sending SMS.

US 2006/0293046 proposes a method for exploiting data from a wireless telephony network to support traffic analysis. Data related to wireless network users are extracted from the wireless network to determine the location of a mobile station. Additional location records for the mobile station can be used to characterize the movement of the mobile station: its speed, its route, its point of origin and destination, and its primary and secondary transportation analysis zones. Aggregating data associated with multiple mobile stations allows characterizing and predicting traffic parameters, including traffic speeds and volumes along routes.

In F. Calabrese, F. Pereira, G. Di Lorenzo, L. Liu, C. Ratti, "The geography of taste: analyzing cell-phone mobility and social events", in Proceedings of the 8th International Conference, Pervasive Computing 2010, Helsinki, Finland, May 17-20, 2010, Lecture Notes in Computer Science Volume 6030, 2010, pp 22-37, discloses an analysis of crowd mobility during special events. Nearly 1 million cell-phone traces have been analyzed and their destinations have been associated with social events. It is observed that the origins of people attending at an event are strongly correlated to the type of event, with implications in city management, since the knowledge of additive flows can be a critical information on which to take decisions about events management and congestion mitigation.

SUMMARY OF THE INVENTION

The Applicant has observed that, generally, methods and systems known in the art provide unsatisfactory results, as they are not able to determine (or have a limited ability in determining) whether a UE owner has moved to/from an Area of Interest (AoI) where one or more public happenings have been held, for attending thereat or for other reasons (for example, because the UE owner resides or has a business in proximity of, or within, the area of interest). In addition, the results provided by the known solutions are strongly influenced by the size of the Area of Interest selected for identifying the movements and subsequently computing O-D matrices related to one or more public happenings. In other words, if the area of interest has a large size, the movement of a certain number of UE owners that have not attended at the one or more public happenings will be taken into account in the computing of O-D matrices of movements related to such one or more public happenings. Conversely, if the area of interest has small size, the movements of a certain number of UE owners that attended at the one or more public happenings will be excluded from the computing of the O-D matrices of movements related to such one or more public happenings.

Therefore, subsequent planning and managing of resources and activities (of the type mentioned above) based on O-D matrices obtained by the methods and systems known in the art will achieve a limited efficiency due to the limited accuracy thereof.

The Applicant has thus coped with the problem of devising a system and method adapted to overcome the problems affecting the prior art solutions.

The Applicant has designed an adaptive method for identifying the movements of UE owners that attended at the one or more public happenings and for computing O-D matrices related to such movements.

The Applicant has found that it is possible to determine the size of an optimal area of interest on the basis of operational information related to UE during the course of the one or more public happening and in a certain number of days preceding the one or more public happenings.

Particularly, one aspect of the present invention proposes a method of estimating flows of persons that gathered at an Area of Interest for attending a public happening Sn during a time interval [Tsn, Ten] on a day gn. Said Area of Interest is defined by an Area of Interest center C and an Area of Interest radius Ra and is covered by a mobile telecommunication network having a plurality of communication stations each of which is adapted to manage communications of user equipment in one or more served areas in which the mobile telecommunication network is subdivided. The method comprises the following steps: a) defining a plurality of calculated radius values Rk of the Area of Interest radius Ra, and, for each calculated radius value Rk: b) identifying a first number Unk of user equipment associated with at least one event record $er_v$ of a corresponding event $e_v$ of interaction occurred between the user equipment and the mobile communication network during the time interval [Tsn, Ten] on the day gn within the Area of Interest; c) identifying a second number Upnk of user equipment associated with at least one event record $er_v'$ of a corresponding event $e_v'$ of interaction occurred between the user equipment and the mobile communication network during the time interval

[Tsn, Ten] for each day of a predetermined number P of previous days gpn preceding the day gn within the Area of Interest; d) combining the first number Unk of user equipment and the second numbers Upnk of user equipment for obtaining a statistical quantity Znk; e) detecting the occurrence of the public happening Sn if the statistical quantity Znk reaches a certain threshold Zth; f) computing an optimum radius value Ro of the Area of Interest radius Ra as the average of the calculated radius values Rk within which the public happening Sn is detected; g) identifying persons that gathered for attending at the public happening Sn within an Area of Interest having the Area of Interest radius Ra equal to the optimum radius value Ro during the time interval [Tsn, Ten] on the day gn within the Area of Interest based on a first time fraction f1 indicating a probability that the user equipment has been in the Area of Interest during the time interval [Tsn, Ten] on the day gn and on a second time fraction f2 indicating a probability that the user equipment has been in the Area of Interest during the previous days gpn for each user equipment identified at step b), h) computing at least one matrix accounting for movements of persons identified at step g) within a Region of Interest comprising the Area of Interest to the Area of Interest during at least one observation time period OsPn comprising the time interval [Tsn, Ten], and i) computing at least one matrix accounting for movements of persons identified at step g) within a Region of Interest comprising the Area of Interest from the Area of Interest during at least one observation time period DsPn comprising the time interval [Tsn, Ten].

Preferred features of the present invention are set forth in the dependent claims.

In one embodiment of the present invention, the public happening Sn comprises a plurality of public happenings Sn, and the method further comprises the step of: j) iterating steps b) to e) for each one of the public happenings Sn of the plurality of public happenings Sn, and wherein the step f) of computing an optimum radius value Ro of the Area of Interest radius Ra as the average of the computed radius values Rk within which the public happening is detected, comprises: computing an optimum radius value Ro of the Area of Interest radius Ra as the average of the computed radius values Rk weighted by a number Dsk of detected public happenings Sn within the Area of Interest having the Area of Interest radius Ra equal to the same computed radius values Rk, said number Dsk of detected public happenings Sn being the sum of the public happenings Sn determined by iterating step e).

In one embodiment of the present invention, the steps h) of computing at least one matrix accounting for movements of persons identified at step g) within a Region of Interest comprising the Area of Interest to the Area of Interest during at least one observation time period TPn, OsPn, DsPn comprising the time interval [Tsn, Ten], and i) of computing at least one matrix accounting for movements of persons identified at step g) within a Region of Interest comprising the Area of Interest from the Area of Interest during at least one observation time period TPn, OsPn, DsPn comprising the time interval [Tsn, Ten], comprise: k) subdividing the Region of Interest into at least two zones $z_q$; l) associating a first zone $zn_h$ of the at least two zones zn with the Area of Interest, the first zone $zn_h$ comprising at least partially the Area of Interest; m) subdividing the at least one time period TPn, OsPn, DsPn into one or more time slots $ts_{m,n}$, $ts_{m',n}$, $ts_{m'',n}$; n) identifying a number of persons that moved from a second zone $zn_0$ of the at least two zones $z_q$ to the first zone $zn_h$ comprising at least partially the Area of Interest during each one of the one or more time slots $ts_{m',n}$ of the at least one observation time period OsPn, and o) identifying a number of persons that moved to the second zone $zn_{l-1}$ of the at least two zones $z_q$ from the first zone $zn_h$ comprising at least partially the Area of Interest during each one of the one or more time slots $ts_{m'',n}$ of the at least one observation time period DsPn.

In one embodiment of the present invention, the step n) of identifying a number of persons that moved from a second zone $zn_0$ of the at least two zones $z_q$ to the first zone $zn_h$ comprising at least partially the Area of Interest during each one of the one or more time slots $ts_m'$ of the at least one observation time period OsPn, comprises: identifying as the second zone $zn_0$ the zone $z_q$ of the Region of Interest that comprises a previous position $pn_0$ associated with a previous event record $er_0$ of a corresponding previous event $e_0$ of interaction occurred between the user equipment and the mobile communication network during the observation time period OsPn on the day gn within the Region of interest, the previous event record $er_0$ being recorded before a first event record $er_f$ of a corresponding first event $e_f$ of interaction occurred between the user equipment and the mobile communication network during the time interval [Tsn, Ten] on the day gn within the Area of Interest.

In one embodiment of the present invention, the step n) of identifying a number of persons that moved from a second zone $zn_0$ of the at least two zones $z_q$ to the first zone $zn_h$ comprising at least partially the Area of Interest during each one of the one or more time slots $ts_m'$ of the at least one observation time period OsPn, further comprises: p) computing an origin matrix for each one of the one or more time slots $ts_{m',n}$ in which the at least one time period OsPn has been subdivided, each entry $od(0,h)_n$ of the origin matrix being indicative of the number of persons that, during the corresponding time slot, moved to the first zone $zn_h$ comprising at least partially the Area of Interest from the second zone $zn_0$ of the at least two zones $z_q$.

In one embodiment of the present invention, the step p) of computing an origin matrix for each one of the one or more time slots $ts_{m',n}$ in which the at least one time period OsPn has been subdivided, each entry $od(0,h)_n$ of the origin matrix being indicative of the number of persons that, during the corresponding time slot, moved to the first zone $zn_h$ comprising at least partially the Area of Interest from the second zone $zn_0$ of the at least two zones $z_q$, comprises: increasing a value of the entry $od(0,h)_n$ indicative of persons that moved from the second zone $zn_0$ of the at least two zones $z_q$ to the first zone $zn_h$ comprising at least partially the Area of Interest of the origin matrix associated with a time slot $ts_m'$ comprising a previous time data $tdn_0$ associated with the previous event record $er_0$.

In one embodiment of the present invention, the step p) of computing an origin matrix for each one of the one or more time slots $ts_{m',n}$ in which the at least one time period OsPn has been subdivided, each entry $od(0,h)_n$ of the origin matrix being indicative of the number of persons that, during the corresponding time slot $ts_{m',n}$ moved to the first zone $zn_h$ comprising at least partially the Area of Interest from the second zone $zn_0$ of the at least two zones $z_q$, comprises: increasing a value of the entry $od(0,h)_n$ indicative of persons that moved from the second zone $zn_0$ of the at least two $z_q$ zones to the first zone $zn_h$ comprising at least partially the Area of Interest of the origin matrix associated with a time slot $ts_{m',n}$ comprising a first time data $tdn_f$ associated with the first event record $er_f$.

In one embodiment of the present invention, the step p) of computing an origin matrix for each one of the one or more time slots $ts_{m',n}$ in which the at least one time period OsPn has been subdivided, each entry od(0,h)$_n$ of the origin matrix being indicative of the number of persons that, during the corresponding time slot ts$_{m',n}$, moved to the first zone zn$_h$ comprising at least partially the Area of Interest from the second zone zn$_0$ of the at least two zones z$_q$, comprises: identifying an origin movement time interval [tdn$_0$, tdn$_f$] delimited by a previous time data tdn$_0$ associated with the previous event record er$_0$ of the corresponding previous event e$_0$ and a first time data tdn$_f$ associated with the first event record er$_f$ of the corresponding first event e$_f$, and increasing a value of the entry od(0,h)$_n$ indicative of persons that moved from the second zone zn$_0$ of the at least two zones z$_q$ to the first zone zn$_h$ comprising at least partially the Area of Interest of the origin matrices associated with time slots ts$_{m',n}$ comprised at least partially in the movement time interval [tdn$_0$, tdn$_f$].

In one embodiment of the present invention, the step o) of identifying a number of persons that moved to the second zone zn$_{I+1}$ of the at least two zones z$_q$ from the first zone zn$_h$ comprising at least partially the Area of Interest during each one of the one or more time slots ts$_{m'',n}$ of the at least one observation time period DsPn, comprises: identifying as the second zone zn$_{I+1}$ the zone z$_q$ of the Region of Interest that comprises a next position pn$_{I+1}$ associated with a next event er$_{I+1}$ record of a corresponding previous event e$_{I+1}$ of interaction occurred between the user equipment and the mobile communication network during the observation time period DsPn on the day gn within the Region of interest, the next event record er$_{I-1}$ being recorded after a last event record er$_I$ of a corresponding last event e$_I$ of interaction occurred between the user equipment and the mobile communication network during the time interval DsPn on the day gn within the Area of Interest.

In one embodiment of the present invention, step o) of identifying a number of persons that moved to the second zone zn$_{I+1}$ of the at least two zones z$_q$ from the first zone zn$_h$ comprising at least partially the Area of Interest during each one of the one or more time slots ts$_{m'',n}$ of the at least one observation time period DsPn, further comprises: q) computing a destination matrix for each one of the one or more time slots ts$_{m'',n}$ in which the at least one time period DsPn has been subdivided, each entry od(h,I+1)$_n$ of the destination matrix being indicative of the number of persons that, during the corresponding time slot ts$_{m'',n}$, moved from the first zone zn$_h$ comprising at least partially the Area of Interest to the second zone zn$_{I+1}$ of the at least two zones z$_q$.

In one embodiment of the present invention, the step q) of computing a destination matrix for each one of the one or more time slots ts$_{m'',n}$ in which the at least one time period DsPn has been subdivided, each entry od(h,I+1)$_n$ of the destination matrix being indicative of the number of persons that, during the corresponding time slot ts$_{m'',n}$, moved from the first zone zn$_h$ comprising at least partially the Area of Interest to the second zone zn$_{I+1}$ of the at least two zones z$_q$, comprises: increasing a value of the entry od(h,I+1)$_n$ indicative of persons that moved to a second zone zn$_{I+1}$ of the at least two zones z$_q$ from the first zone zn$_h$ comprising at least partially the Area of Interest of the destination matrix associated with a time slot ts$_{m'',n}$ comprising a last time data tdn$_I$ associated with the last event record er$_I$.

In one embodiment of the present invention, the step q) computing a destination matrix for each one of the one or more time slots ts$_{m'',n}$ in which the at least one time period DsPn has been subdivided, each entry od(h,I+1)$_n$ of the destination matrix being indicative of the number of persons that, during the corresponding time slot ts$_{m'',n}$, moved from the first zone zn$_h$ comprising at least partially the Area of Interest to the second zone zn$_{I+1}$ of the at least two zones z$_q$, comprises: increasing a value of the entry od(h,I+1)$_n$ indicative of persons that moved to a second zone zn$_{I+1}$ of the at least two zones z$_q$ from the first zone zn$_h$ comprising at least partially the Area of Interest of the destination matrix associated with a time slot ts$_{m'',n}$ comprising a next time data tdn$_{I+1}$ associated with the next event record er$_{I-1}$.

In one embodiment of the present invention, the step q) computing a destination matrix for each one of the one or more time slots ts$_{m'',n}$ in which the at least one time period DsPn has been subdivided, each entry od(h,I+1)$_n$ of the destination matrix being indicative of the number of persons that, during the corresponding time slot ts$_{m'',n}$, moved from the first zone zn$_h$ comprising at least partially the Area of Interest to the second zone zn$_{I+1}$ of the at least two zones z$_q$, comprises: identifying a destination movement time interval [tdn$_I$, tdn$_{I+1}$] delimited by a last time data tdn$_I$ associated with the last event record er$_I$ of the corresponding last event e$_I$ and a next time data tdn$_{I+1}$ associated with the next event record er$_{I+1}$ of the corresponding next event e$_{I+1}$, and increasing a value of the entry od(h,I+1)$_n$ indicative of persons that moved to a second zone zn$_{I+1}$ of the at least two zones z$_q$ from the first zone zn$_h$ comprising at least partially the Area of Interest of the destination matrices associated with time slots ts$_{m'',n}$ at least partially comprised in the destination movement time interval [tdn$_I$, tdn$_{I+1}$].

In one embodiment of the present invention, the step g) identifying persons that gathered for attending at the public happening Sn within an Area of Interest having the Area of Interest radius Ra equal to the optimum radius value Ro during the time interval [Tsn, Ten] on the day gn within the Area of Interest based on a first time fraction f1 indicating a probability that the user equipment has been in the Area of Interest during the time interval [Tsn, Ten] on the day gn and on a second time fraction f2 indicating a probability that the user equipment has been in the Area of Interest during the previous days gpn for each user equipment identified at step b), comprises: estimating a probability pu that each person is attending at the public happening Sn, for each person associated with a respective user equipment of the first number identified at step c), based on the first time fraction f1 and the second time fraction f2.

In one embodiment of the present invention, the step n) of identifying a number of persons that moved from a second zone zn$_0$ of the at least two zones z$_q$ to the first zone zn$_h$ comprising at least partially the Area of Interest during each one of the one or more time slots ts$_{m',n}$ of the at least one observation time period OsPn, further comprises: computing the number as a combination of the probabilities pu of each person that moved from a second zone zn$_0$ of the at least two zones z$_q$ to the first zone zn$_h$ comprising at least partially the Area of Interest during each one of the one or more time slots ts$_{m',n}$ of the at least one observation time period OsPn has attended at the public happening Sn.

In one embodiment of the present invention, the step o) of identifying a number of persons that moved to the second zone zn$_{I+1}$ of the at least two zones z$_q$ from the first zone zn$_h$ comprising at least partially the Area of Interest during each one of the one or more time slots ts$_{m'',n}$ of the at least one observation time period DsPn, further comprises: computing the number as a combination of the probabilities pu of each person that moved to the second zone zn$_{I-1}$ of the at least two zones z$_q$ from the first zone zn$_h$ comprising at least partially the Area of Interest during each one of the one or more time slots ts$_{m'',n}$ of the at least one observation time period DsPn has attended at the public happening.

In one embodiment of the present invention, step k) of subdividing the Region of Interest into at least two zones zn, comprises: subdividing the Region of Interest into a plurality of zones $z_q$, and wherein the step n) of identifying a number of persons that moved from a second zone $zn_0$ of the at least two zones $z_q$ to the first zone $zn_h$ comprising at least partially the Area of Interest during each one of the one or more time slots $ts_{m',n}$ of the at least one observation time period OsPn, further comprises: identifying a number of persons that moved from each zone $z_q$ of the plurality of zones to the first zone $zn_h$ comprising at least partially the Area of Interest during each one of the one or more time slots $ts_{m',n}$ of the at least one observation time period OsPn, and wherein the step o) of o) of identifying a number of persons that moved to the second zone $zn_{I+1}$ of the at least two zones $z_q$ from the first zone $zn_h$ comprising at least partially the Area of Interest during each one of the one or more time slots $ts_{m'',n}$ of the at least one observation time period DsPn, comprises: identifying a number of persons that moved to each zone $z_q$ of the plurality of zones from the first zone $zn_h$ comprising at least partially the Area of Interest during each one of the one or more time slots $ts_{m'',n}$ of the at least one observation time period DsPn.

In one embodiment of the present invention, the method further comprises the step r) of iterating steps l) to q) for each one of the public happenings Sn.

Another aspect according to the present invention proposes a system coupled with a wireless telecommunication network for estimating flows of persons that gathered at an Area of Interest, the system comprising: a computation engine adapted to process data retrieved from a mobile telephony network; a repository adapted to store data regarding interactions between the user equipment and the mobile telephony network, computation results generated by the computation engine and, possibly, any processing data generated by and/or provided to the system, and an administrator interface operable for modifying parameters and/or algorithms used by the computation engine and/or accessing data stored in the repository. The system further comprises a memory element storing a software program product configured for implementing the method above through the system.

In one embodiment of the present invention, the system further comprises at least one user interface adapted to receive inputs from, and to provide output to a user of the system, the user comprising one or more human beings and/or one or more external computing systems subscriber of the services provided by the system.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIG. 6 shows a generic O-D matrix related to the geographic region of interest RoI of FIG. 5, corresponding to a certain time slot of an observation period.

DETAILED DESCRIPTION OF THE INVENTION

Figure 1:
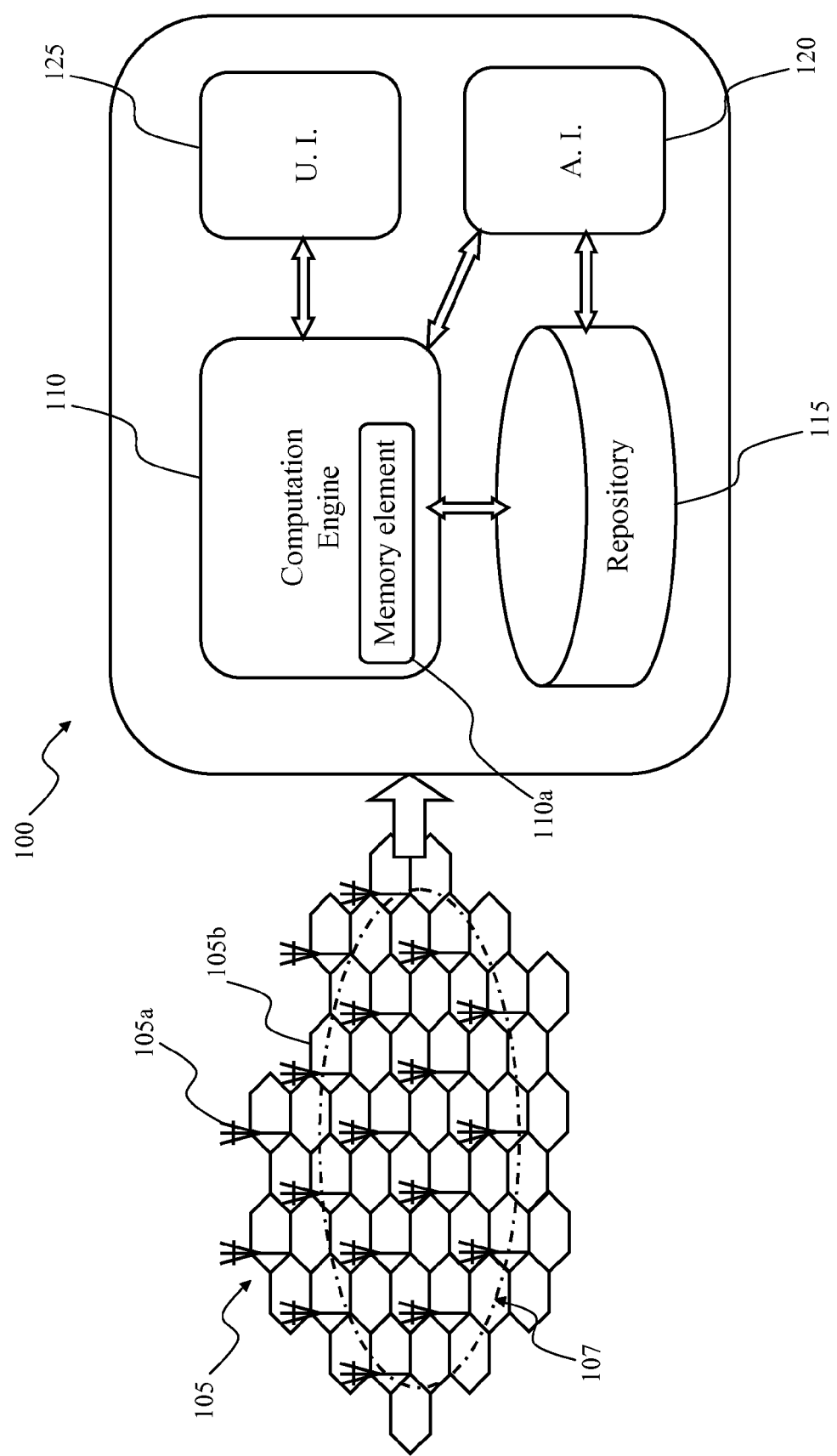
FIG. 1 is a schematic representation of a system for identifying movements and for computing O-D matrices related to one or more public happenings according to an embodiment of the present invention.

The Applicant has designed an adaptive method for identifying the movements (or flows) of User Equipments, UE in the following (e.g. a mobile phone, a smartphone, a tablet with 2G-3G-4G connectivity, etc.), that attended at one or more public happenings and for computing O-D matrices related to such movements.

The method according to the present invention allows identifying an optimal area of each considered public happening that is used as starting point for identifying persons who attended the public happening and for identifying their movement before and/or after having attended the public happening.

Such an optimal area will depend on the place where each public happening has been held (e.g., a stadium, a square, a theatre etc.) but also on the kind of public happening (e.g., sport match, concert, theatrical play etc.).

In order to correctly identifying the movements of the persons that have attended at each public happening, and excluding persons that live or that usually spend time in the neighborhood of the place where the public happening is held (which could be identified and their movements tracked as well by slightly modifying the method according to the present invention), an "influence area" or Area of Interest for each public happening has to be determined first.

For example, let it be assumed that the place where each public happening has been held is a circumference featuring a center and a radius, firstly it is needed to determine an optimal value for the radius, and then it is possible to determine a set of served areas of a wireless communication network influenced by each one of the one or more public happenings, i.e. which served areas have received the (phone) data traffic associated with the UE owned by persons that attended each public happening.

For example, let it be considered a stadium in which two sport matches are held: the first sport match gathers 10000 attendees, while the second sport match, being more interesting, gathers 30000 attendees. During the second match the (phone) data traffic (where 'data' is referred to any information exchanged between the UE and a mobile communication network serving it, such as for example voice traffic, SMS/MMS traffic, Internet traffic, operating data exchanged for managing communications etc.) will be greater than in the first sport match, and, in order to fulfill all the (phone) data traffic a greater number of served areas are needed with respect to the served areas involved during the first sport match. Therefore the area of the second sport match is presumably greater than the area of the first sport match. The method according to the present invention is able to identify the served areas of the wireless network effectively involved in serving the UEs owned by the attendees in both the first and second sport matches.

The method according to the present invention described in the following allows a posteriori identifying the movements, e.g. represented in the form of the so-called Origin Destination matrices, of those persons that have attended one or more public happenings held at a given place. The same method according to an embodiment of the invention may be used without the need of substantial changes for identifying movements of persons that visited a predetermined Point of Interest (e.g., a museum) during different days or during different hours.

The method according to the present invention described in the following, exploits information of UEs owned by the persons that attended the one or more public happenings, such as for example CDR (Call Detail Record) and/or VLR (Visitor Location Register), which are known to the provider of the wireless communication network which serves the UE. Such information mainly comprises position-time pairs associated to any interaction between the UE and the wireless communication network (the position substantially corresponding to the served area of the wireless communication network where the UE is located at the moment of the interaction).

In the following reference will be made substantially only to a wireless communication network for telephony services and to the CDR, even though any position-time pair information may be exploited by the method according to the present invention without requiring any substantial change. For example, the method may exploit information provided by 'short range' wireless communication networks, such as for example Wireless Local Area Networks (WLAN), Bluetooth-based networks and/or other network capable of providing position information such as for example the Global Positioning System (GPS).

With reference to the drawings, FIG. 1 is a schematic representation of a system for identifying movements and for computing O-D matrices related to one or more public happenings, simply denoted as system 100 hereinafter, according to an exemplary embodiment of the present invention.

The system 100 allows performing an estimation of movements, and thus allows computing corresponding O-D matrices, of people that attended at one or more public happenings, of the most disparate nature, like for example (and non-exhaustively) live television shows, artistic/entertaining performances, cultural exhibitions, theatrical plays, sports contests, concerts, movies, demonstrations and so forth.

The system 100 is coupled to a mobile communication network 105, such as a (2G, 3G, 4G or higher generation) mobile telephony network, and is configured for receiving from the mobile communication network 105 positioning data of each UE of individuals located in a geographic Area of Interest, AoI in brief, schematized in FIG. 1 as the area within the dash-and-dot line 107 (e.g., a building, such as for example a stadium or a theatre or a cinema, the surroundings thereof, a square or a street(s) of a city or town or village, a district etc.).

The AoI 107 (further described in the following) may generally comprise a core place (e.g., a stadium, a theater, a city square and so on) where one or more public happenings have taken place and, possibly, surroundings (e.g., nearby parking lots, nearby streets, nearby transport stations and so forth) of the core place.

The mobile communication network 105 comprises a plurality of (two or more) communication stations 105a (e.g., radio base stations of the mobile telephony network) geographically distributed through the AoI 107. Each communication station 105a is adapted to manage communications of UE (not shown, such as for example mobile phones) in one or more served areas or cells 105b (in the example at issue, three cells are served by each communication station 105a) as will be discussed in greater detail below.

Even more generally, each communication station 105a of the mobile communication network 105 is adapted to interact with any UE located within one of the cells 105b served by such communication station 105a (e.g., interactions at power on/off, at location area update, at incoming/outgoing calls, at sending/receiving SMS and/or MMS, at Internet access etc.). Such interactions between UE and mobile communication network 105 will be generally denoted as events $e_v$ (v=1, . . . , V; where V is an integer) in the following.

The system 100 comprises a computation engine 110 configured to be adapted to process data retrieved from the mobile communication network 105, and a repository 115 (such as a database, a file system, etc.) configured to be adapted to store data regarding interactions between the UE and the mobile communication network 105, computation results generated by the computation engine 110 and, possibly, any processing data generated by and/or provided to the system 100 (generally in a binary format). The system 100 is provided with an administrator interface 120 (e.g., a computer) configured and operable for modifying parameters and/or algorithms used by the computation engine 110 and/or accessing data stored in the repository 115.

Preferably, the system 100 comprises one or more user interfaces 125 (e.g., a user terminal, a software running on a remote terminal connected to the system 100) adapted to receive inputs from, and to provide output to a user of the system 100. The term "user of the system" as used in the present disclosure may refer to one or more human beings and/or to external computing systems (such as a computer network, not shown) of a third party being subscriber of the services provided by the system 100 and enabled to access the system 100 e.g., under subscription of a contract with a service provider owner of the system 100, and typically with reduced right of access to the system 100 compared to the right of access held by an administrator of the system 100 operating through the administrator interface 120.

It should be appreciated that the system 100 may be implemented in any known manner; for example, the system 100 may comprise a single computer, or a network of distributed computers, either of physical type (e.g., with one or more main machines implementing the computation engine 110 and the repository 115, connected to other machines implementing administrator and user interfaces 120 and 125) or of virtual type (e.g., by implementing one or more virtual machines in a computer network).

The system 100 is adapted to retrieve (and/or receive) an event record $er_v$ for each event $e_v$ occurred between a UE and the mobile communication network 105 (through one of its communication stations 105a) within the AoI 107. Preferably, each event record $er_v$ retrieved by the system 100 from the mobile communication network 105 comprises in a non-limitative manner an identifier of the UE that is involved in the corresponding event $e_v$ (e.g., the UE identifier may be selected as one or more among the International Mobile Equipment Identity—IMEI, the International Mobile Subscriber Identity—IMSI and the Mobile Subscriber ISDN Number—MSISDN code), time data (also denoted as timestamps) indicating the time at which the corresponding event $e_v$ has occurred, and UE geographical position data, e.g. spatial indications based on the cell 105b in which the UE is located at the time of occurrence of the corresponding event $e_v$.

In one embodiment of the present invention, the UE identifier of the UE involved in the event record $er_v$ may be provided as encrypted information in order to ensure the privacy of the UE owner. Anyway, if the need arises, the encrypted information (i.e., the identity of the owner of the UE corresponding to the UE identifier) may be decrypted by implementing a suitable decryption algorithm, such as for example the algorithm SHA256 described in "Secure Hash Standard (SHS)", National Institute of Standards and Technology FIPS—180-4, Mar. 6, 2012.

The system 100 may retrieve (and/or receive) the event records $er_v$ related to a generic UE from the mobile communication network 105 by acquiring records of data generated and used in the mobile communication network 105. For example, in case the mobile communication network 105 is a GSM network, Charging Data Records (CDR), also known as call data records, and/or Visitor Location Records (VLR) may be retrieved from the mobile communication network 105 and re-used as event records $er_v$. The CDR is a data record (usually used for billing purposes by a mobile telephony service provider operating through the mobile communication network 105) that contains attributes specific to a single instance of a phone call or other communication transaction performed between a UE and the mobile communication network 105. The VLR are databases listing UE that have roamed into the jurisdiction of a Mobile Switching Center (MSC, not shown) of the mobile communication network 105, which is a management element of the mobile communication network 105 managing events over a plurality of communication stations 105a. Each communication station 105a in the mobile communication network 105 is usually associated with a respective VLR.

Conversely, if the mobile communication network 105 is a LTE network, records of data associated with the event records $er_v$ of a generic UE are generated by a Mobility Management Entity, or MME, comprised in the mobile communication network 105, which is responsible for a UE tracking and paging procedure in LTE networks (where no VLR is implemented).

It should be noted that the method described in the present disclosure may be implemented by using any source of data (e.g., provided by one or more WiFi networks) from which it is possible to obtain event records $er_v$ comprising a univocal identifier of individuals (such as the UE identifier mentioned above), a position indication of such individuals, and a time indication of an instant during which such event has occurred.

In operation, event records $er_v$ may be continuously retrieved by the system 100 from the mobile communication network 105. Alternatively, event records $er_v$ may be collected by the system 100 periodically, e.g. for a predetermined time period (e.g., every certain number of hours, on a daily or weekly basis). For example, event records $er_v$ may be transferred from the mobile communication network 105 to the system 100 as they are generated, in a sort of "push" modality, or event records $er_v$ may be collected daily in the mobile communication network 105 and then packed and transferred to the system 100 periodically or upon request by the system 100.

The event records $er_v$ retrieved from the mobile communication network 105 are stored in the repository 115, where they are made available to the computation engine 110 for processing. Preferably, event records $er_v$ generated by a same UE are grouped together in the repository 115, i.e. event records $er_v$ are grouped together if they comprise a common UE identifier and are denoted to as event records group $erg_l$ (e.g., l=0, . . . , L, L≥0) hereinafter.

Preferably, the computation engine 110 processes an algorithm for identifying and analyzing the traffic flows of people (described in the following) implemented by a software program product stored in a memory element 110a of the system 110, comprised in the computation engine 110 in the example of FIG. 1, even though the software program product could be stored in the repository 115 as well (or in any other memory element provided in the system 100).

Even more preferably, the event records $er_v$ are processed according to (as discussed in detail below) instructions provided by the system administrator (through the administrator interface 120), for example stored in the repository 115, and, possibly, according to instructions provided by a user (through the user interface 125) Finally, the computation engine 110 provides the results of the processing performed on the event records $er_v$ to the user through the user interface 125, and optionally stores such processing results in the repository 115.

Turning now to FIGS. 2A-2E, they are exemplary shapes in which the cells 105b of the mobile communication network 105 may be modeled according to an embodiment of the present invention.

Figure 2D:
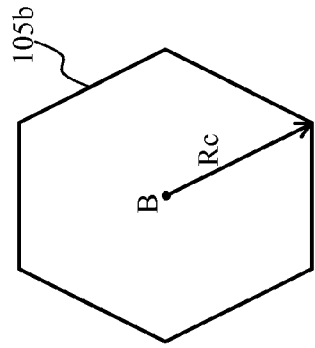
FIGS. 2A-2E are exemplary shapes in which the cells of the mobile communication network may be modeled according to an embodiment of the present invention.
Figure 2E:
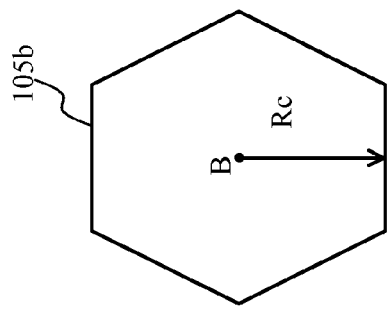
Figure 2B:
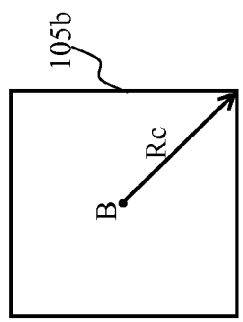
Figure 2C:
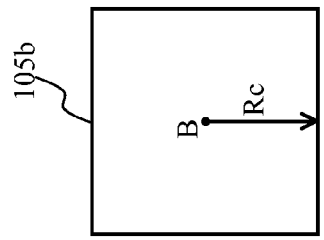
Figure 2A:
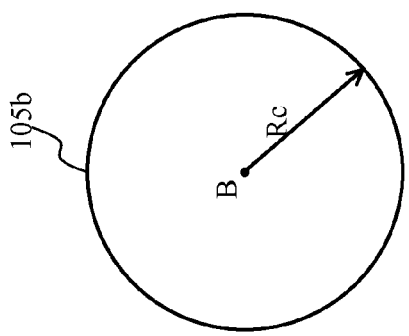

For the purposes of the present invention, each cell 105b of the mobile communication network 105 may be modeled as an area (as shown in FIG. 2A) having a respective cell center B (not necessarily corresponding to a geographic position of the communication station 105a) and a respective cell radius Rc, that encloses an effectively served area (not shown) served by the corresponding communication station 105a (e.g., an area in which each point is reached by radio-signals transmitted by the communication station 105a). Alternatively, the cell radius Rc may correspond to the radius of a circumference that encloses a substantial part of the effectively served area, such as the 85% or more of the effectively served area, such as for example the 90%, of the effectively served area.

It should be noted that the cells 105b are not limited to a disc-like shape, in facts, the cells 105b may have the shape of a, preferably regular, polygon. In this case, the cell center B corresponds to a center of mass (or centroid) of the polygon, while the cell radius Rc corresponds to a segment adjoining the center of mass of the polygon, i.e. the cell center B, with a vertex of the polygon (as shown in FIGS. 2B and 2D) or with a midpoint of a side of the polygon (as shown in FIGS. 2C and 2E).

The effectively served area, and therefore the cell radius Rc, may be defined by means of well-known network planning software tools used by a provider of the mobile communication network 105, or may be computed on the basis of (omnidirectional or directional, such as with 120° radiation angles) anTennas radiation diagrams and simple radiation models such as for example the ones described in Theodore S. Rappaport, "Wireless Communications", Prentice Hall, 1996.

Alternatively, the mobile communication network 105 may be modeled by means of a Voronoi tessellation diagram, in which each Voronoi cell corresponds to a cell 105b of the mobile communication network 105 (since Voronoi tessellation diagrams are well known in the art, they are not discussed further herein).

Preferably, the modeling, the list and the number of cells 105b of the mobile communication network 105 are inputted to the system 100 by the administrator through the administrator interface 120.

In the solution according to an embodiment of the present invention, the system 100 is adapted to identify whether individuals attended to one or more public happenings occurred within the AoI 107 based on events e generated by an interaction between the UE and the mobile communication network 105 serving such UE within the AoI 107.

Turning now to FIGS. 3A-3E, they are exemplary shapes that the AoI 107 to be determined may take according to an embodiment of the present invention.

Figure 3A:
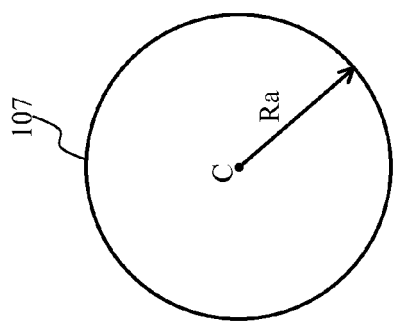
FIGS. 3A-3E are exemplary shapes that the AoI to be determined may take according to an embodiment of the present invention.

Generally, the AoI 107 for one or more public happenings may be modeled as an area having an AoI center C and an AoI radius Ra. For example, the AoI 107 may be delimited by a circumference centered in the AoI center C and having the AoI radius Ra as circumference radius (as shown in FIG. 3A).

Figure 3B:
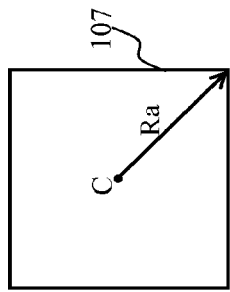
Figure 3C:
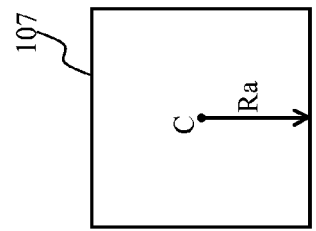
Figure 3D:
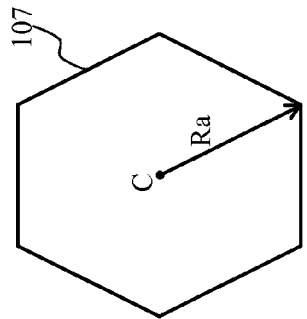
Figure 3E:
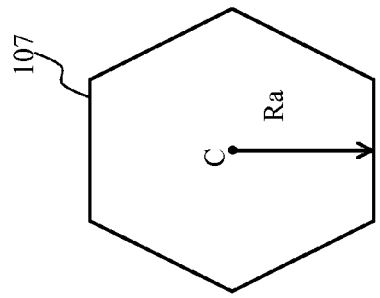
Figure 4B:
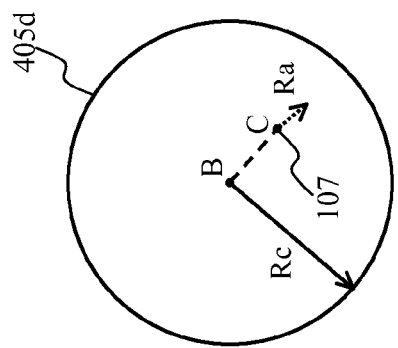
FIGS. 4A-4D are relevant cells among the cells of the mobile communication network with respect to the AoI according to an embodiment of the invention.
Figure 4D:
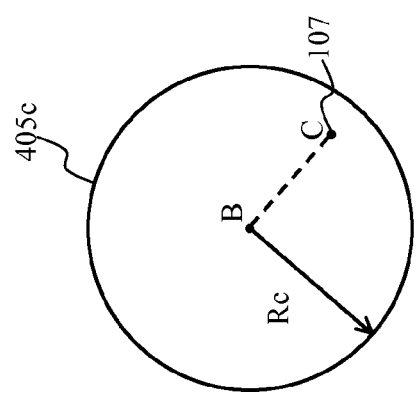
Figure 4C:
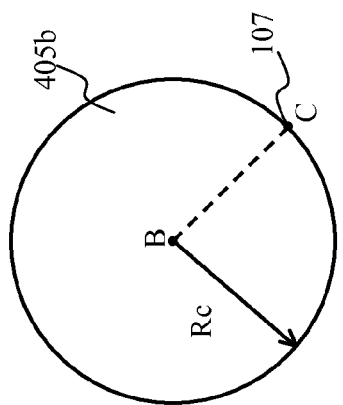
Figure 4A:
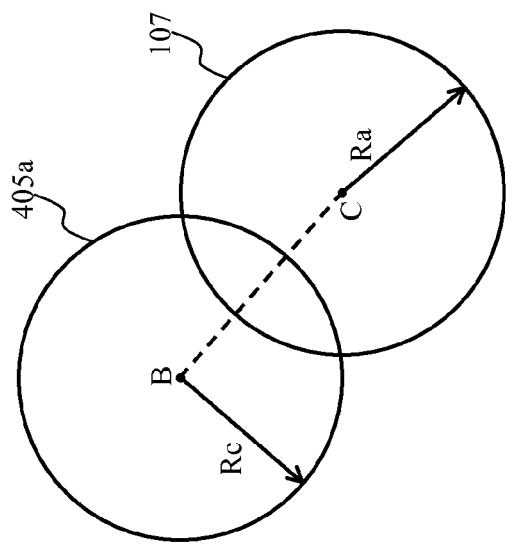

It should be noted that the AoI 107 may have shapes different from the circumference. For example, the AoI 107 may have the shape of a, preferably regular, polygon. In this case, the AoI center C corresponds to a center of mass (or centroid) of the polygon, while the AoI radius Ra corresponds to a segment adjoining the center of mass of the polygon with a vertex of the polygon (as shown in FIGS. 3B and 3D) or with a midpoint of a side of the polygon (as shown in FIGS. 3C and 3E) in a similar way as for the cells 105b modeling discussed above.

The AoI center C may be set (e.g., by a user through the user interface 125 or by a system administrator through the administrator interface 120) as a (geographical) central point of the AoI 107 (e.g., a geographical central point of the core place), as an address of the core place of the one or more public happenings, as a point provided by a mapping software, such as web mapping services (e.g., Google Maps™, OpenStreetMap™, etc.).

As will be described in more detail in the following, the AoI radius Ra may take zero or negative value along with positive values. In case the AoI radius Ra takes zero or negative value, the AoI 107 is limited to the AoI center C (i.e., the core place of the one or more public happenings). The meaning of zero or negative values for the AoI radius Ra will be further clarified by reference to such zero or negative values in the embodiments described below.

The algorithm described in the following is configured to determine an optimum radius value Ro for the AoI radius Ra of the AoI 107. In one embodiment of the invention, the optimum radius value Ro is determined by means of iterative steps starting from a minimum radius value Rmin to a maximum radius value Rmax (as described hereinbelow). Preferably, the minimum radius value Rmin and the maximum radius value Rmax are set by the administrator of the system 100 through the administrator interface 120.

In an embodiment of the present invention, on the basis of statistical analysis of empirical data regarding a plurality of past public happenings the minimum radius value Rmin is set equal to −1500 m (Rmin=−1500 m), while the maximum radius value Rmax is set equal to 1500 m (Rmax=1500 m).

Having defined the shape of the cell 105b of the mobile communication network 105 and the shape of the AoI 107, the concept of relevant cell, i.e., a cell 105b of the mobile communication network 105 that is considered at least partially belonging to the AoI 107 according to an embodiment of the invention will be now be introduced.

FIGS. 4A-4D are relevant cells 405a-d among the cells 105b of the mobile communication network 105 with respect to the AoI 107 according to an embodiment of the invention.

In one embodiment of the invention, given the AoI 107 having the AoI center C and the generic cell 105b having the cell center B and the cell radius Rc, the generic cell 105b may be considered a relevant cell 405a-d for the AoI 107 if the following inequality is verified:

$$\text{Dist}(C,B) \le |Rc+Ra|, \quad (1)$$

where Dist(C, B) is the geographical distance between the AoI center C and the cell center B.

According to the value of the AoI radius Ra of the AoI 107, inequality (1) may take three different meanings.

Namely, if the AoI radius Ra of the AoI 107 is greater than zero (i.e., Ra>0), inequality (1) reduces to:

$$\text{Dist}(C,B) \le (Rc+Ra), \quad (2)$$

and the generic cell 105b is considered a relevant cell (such as the case of relevant cell 405a in FIG. 4A) for the AoI 107 having an AoI radius Ra greater than zero if the area of the AoI 107 and the generic cell 105b are at least partially superimposed (even if the AoI center C fall outside the generic cell 105b).

If the AoI radius Ra of the AoI 107 is equal to zero (i.e., Ra=0) the inequality (1) reduces to:

$$\text{Dist}(C,B) \le Rc, \quad (3)$$

and the generic cell 105b is considered a relevant cell (such as the case of relevant cells 405b and 405c in FIGS. 4B and 4C) for the AoI 107 having an AoI radius Ra equal to zero if the AoI center C of the AoI 107 is comprised in the generic cell 105b.

Finally, if the AoI radius Ra of the AoI 107 is smaller than zero (i.e., Ra<0) the generic cell 105b is considered a relevant cell (such as the case of relevant cell 405d in FIG. 4D) for the AoI 107 having an AoI radius Ra smaller than zero if the AoI center C of the AoI 107 is comprised within the generic cell 105b at a distance from the cell center B equal to or smaller than Rc−|Ra|.

A generic public happening S, apart from being held at a specific location (i.e., the AoI 107), has a start time Ts and an end time Te. Consequently, for the purposes of the present invention the generic public happening S has a relevant duration equal to an observation time interval [Ts, Te] (i.e., a time interval that starts at the start time Ts and ends at the end time Te, lasting for Te−Ts time units, e.g. seconds, minutes or hours).

Both the start time Ts and the end time Te may be defined so as to correspond to the official (officially announced) start and end times scheduled for that generic public happening S. Nevertheless, the Applicant has observed that by anticipating the start time Ts with respect to the official start time of the generic public happening S it is possible to take into account the fact that people (i.e., UE owners that attend at the generic public happening S) arrive at the AoI 107 before the official start time of the generic public happening S, which may be useful for collecting data about a trend in time of a flow of attendees arriving at the generic public happening S. For example, on the basis of empirical data of previous public happenings, the Applicant has found that the start time Ts may be usefully anticipated to 60 minutes before the official start time of the generic public happening S in order to take into account the trend of attendees arriving at the generic public happening S.

Similarly, the Applicant has observed that the end time Te may be delayed with respect to the official end time of the generic public happening S in order to take into account the fact that people leave the AoI 107 after the official end time of the generic public happening S, which may be useful for collecting data about a trend in time of a flow of attendees leaving the generic public happening S. For example, on the basis of empirical data of previous public happenings, the Applicant has found that the end time Ts may be usefully delayed by 30 minutes after the official end time of the generic public happening S in order to take into account the trend of attendees leaving the generic public happening S.

Anyway, the administrator through the administrator interface 120, and/or the user through the user interface 125, may set any custom start time Ts and end time Te for the generic public happening S. For example, the start time Ts and the end time Te may be set in order to define the observation time interval [Ts, Te] shorter than the effective duration of the generic public happening S (i.e., shorter than the duration of the whole public happening) in order to analyze a number or a variation of persons in the crowd that attended at the generic public happening S only during a sub-portion of the whole time duration of the generic public happening S.

Figure 5:
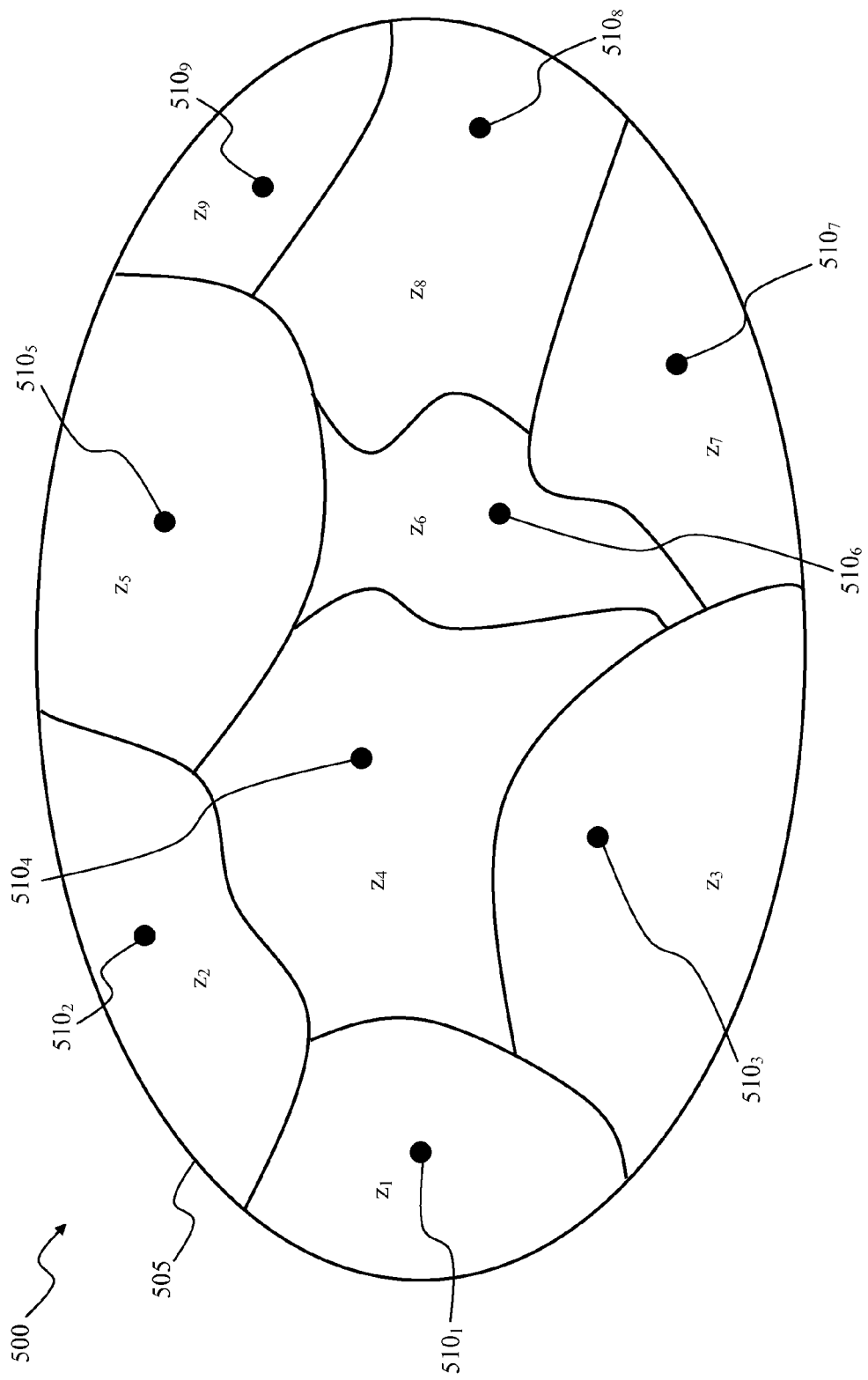
FIG. 5 is a schematic view of a geographic region of interest for performing a traffic analysis of physical entities (e.g., vehicles), the geographic area of interest being subdivided into a plurality of zones.

FIG. 5 is a schematic view of a geographic Region of Interest 500, in the following simply denoted as RoI 500, which is a different entity with respect to the AoI 107 defined above and is not to be mistaken with the latter.

The RoI 500 is a selected geographic region within which a traffic analysis is performed in order to compute O-D matrices according to an embodiment of the present invention. For example, the RoI 500 may be either a district, a town, a city, or any other kind of geographic area. Moreover, the RoI 500 may comprise a number of sub-regions having non-adjacent geographical locations, such as for example a plurality of different cities, different counties and/or different nations (and so on).

It should be noted that the RoI 500 size and exTent is not limited by the AoI 107 size and/or geographical location. Indeed, the RoI 500 may comprise a whole city in which the AoI 107 is located and/or a set of locations (such as for example airports, bus/train stations, etc.) within a selected range from the AoI 107 from which it is probable that flows of people towards/from the AoI 107 originate/are directed. Nevertheless, the RoI 500 may comprise a set of one or more nations from which people that attended at the one or more shows probably live (e.g., in case of public happenings of international relevance).

Let be assumed, as non-limiting example, that a traffic analysis (e.g., an analysis of people flow) over the RoI 500 is performed in order to identifying movements of people that attended at the one or more shows held in the AoI 107 and for computing O-D matrices referred to the movements of people identified by the traffic analysis.

The RoI 500 is delimited by a boundary, or external cordon 505. The RoI 500 is subdivided into a plurality of traffic analysis zones, or simply zones $z_q$ (q=1, . . . , Q; where Q is an integer number, and Q>0) in which it is desired to analyze traffic flows. In the example shown in FIG. 5, the RoI 500 is subdivided into nine zones $z_1, \ldots, z_9$ (i.e., Q=9).

Each zone $z_q$ may be advantageously determined by using the already described zoning technique. According to this technique, each zone $z_q$ may be delimited by administrative (city limits, National boundaries, etc.) and/or physical barriers (such as rivers, railroads etc.) within the RoI 500 that may hinder the traffic flow and may comprise adjacent lots of a same kind (such as open space, residential, agricultural, commercial or industrial lots) which are expected to experience similar traffic flows. It should be noted that the zones $z_q$ may differ in size one another. Generally, each zone $z_q$ is modeled as if all traffic flows starting or ending therein were concentrated in a respective single point or centroid $510q$ (i.e., $510_1, \ldots, 510_9$). In other words, the centroid $510q$ of the generic zone $z_q$ represents an ideal hub from or at which any traffic flow starts or ends, respectively.

Anyway, it is pointed out that the solution according to embodiments of the present invention is independent from the criteria used to partition the RoI 500 into zones.

Considering now FIG. 6, an O-D matrix 600 corresponding to the RoI 500 is depicted. The O-D matrix 600 is referred to a respective time interval or time slot is of an observation time period TP, as described in greater detail in the following. It should be noted that the observation time period is generally different (e.g., greater than) from the observation time interval [Ts, Te] of the public happenings.

The generic O-D matrix 600 is typically a square matrix having Q rows i and Q columns j. Each row and each column are associated with a corresponding zone $z_q$ of the RoI 500; thus, in the example of FIG. 1, the O-D matrix 600 comprises nine rows i=1, . . . , 9 and nine columns j=1, . . . , 9.

Each row i represents an origin zone $z_i$ for traffic flows of moving physical entities (for example land vehicles) while each column j represents a destination zone $z_j$ for traffic flows of such moving physical entities. In other words, each generic element or entry od(i,j) of the O-D matrix 600 represents the number of traffic flows starting in the zone $z_i$ (origin zone) and ending in the zone $z_j$ (destination zone) in the corresponding time slot.

The main diagonal of the O-D matrix 600, which comprises the entries od(i,j) having i=j (i.e., entries od(i,j) having the same zone $z_i$ both as origin and destination zone), is usually left empty (e.g., with values set to 0) or the values of the main diagonal entries od(i,j) are discarded since they do not depict a movement between zones of the region of interest (i.e., such entries do not depict a flow of people).

In the following it will be assumed, for the sake of simplicity and conciseness, that the AoI 107 is comprised within a happening zone $z_h$ (wherein $1 \leq h \leq Q$) of the zones $z_q$ in which the RoI 500 is subdivided. It should be noted that the AoI 107 does not necessarily correspond with the happening zone $z_h$ by which it is comprised (i.e., the AoI 107 may be smaller than the happening zone $z_h$).

It should further be noted that, without departing from the scope of the invention, the AoI 107 may also exTend at least partially over more than one zone $z_q$ of the RoI 500 (for example in case of big public happenings, such as for example city festivals, it is possible to identify a plurality of happening zones within the RoI 500).

From the generic O-D matrix 600 it is possible to extract an O-D sub-matrix, denoted as Origin Matrix (OM), or O matrix 700 in the following, containing only the movements of people towards the AoI 107 (i.e., ended at the happening zone $z_h$ that encloses the AoI 107). It should be noted that the O matrix 700 reduces to a vector in case the AoI 107 is comprised within a single happening zone $z_h$ of the RoI 500.

Figure 7:
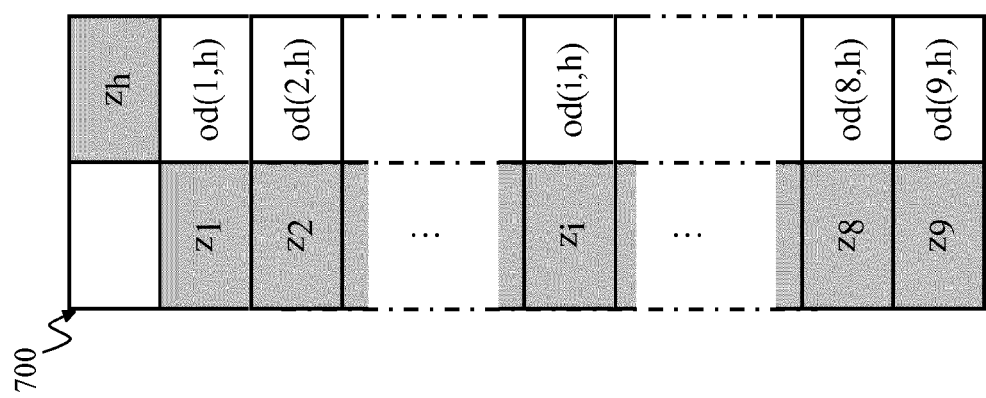
FIG. 7 shows a generic O-D sub-matrix obtained from the O-D matrix of FIG. 6, denoted to as Origin matrix, which comprises the movements of UE owners from zones of the RoI to the AoI.

For example in FIG. 7 it is shown an O-D sub-matrix 700 that contains the entries od(i,j) referred to movements from any one of the zones $z_q$ of the RoI 500 towards (i.e., that ended at) the happening zone $z_h$ within the time slot of the observation time period to which the generic O-D matrix 600 is referred.

Similarly, from the generic O-D matrix 600 it is possible to extract another O-D sub-matrix, denoted as Destination Matrix (DM), or D matrix 800 in the following, containing only the movements of people away from the AoI 107 (i.e., starting at the happening zone $z_h$ that encloses the AoI 107). It should be noted that the D matrix 800 reduces to a vector in case the AoI 107 is comprised within a single happening zone $z_h$ of the RoI 500.

Figure 8:
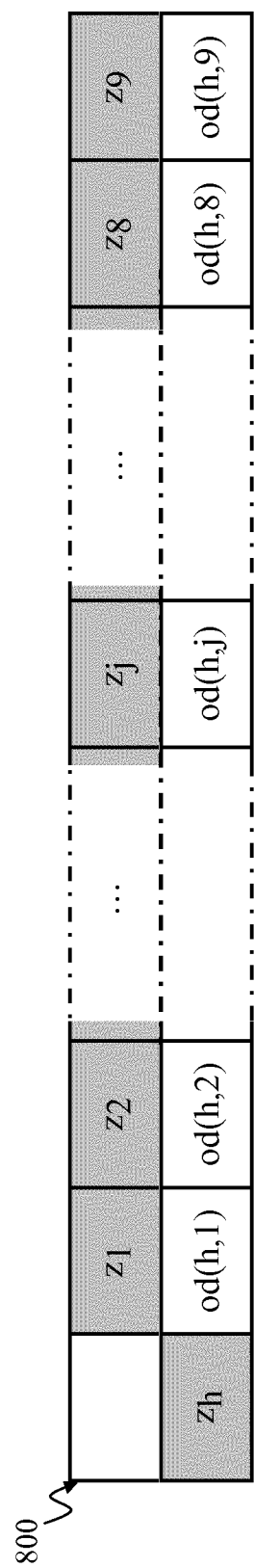
FIG. 8 shows a generic O-D sub-matrix obtained from the O-D matrix of FIG. 6, denoted to as Destination matrix, which comprises the movements of UE owners from the AoI to different zones of the RoI.

For example in FIG. 8 it is shown an O-D sub-matrix 800 that contains the entries od(i,j) referred to movements from the happening zone $z_h$ towards (i.e., that ended at) any one of the zones $z_q$ of the RoI 500 within the time slot of the observation time period to which the generic O-D matrix 600 is referred.

As outlined above, in order to obtain a more detailed and reliable traffic analysis, a predetermined observation period TP of the traffic flows in the region of interest is also established and it is subdivided into one or more (preferably a plurality) of time slots $ts_m$ (m=1, ..., M, where M is an integer number, and M>0). Each time slot $ts_m$ ranges from an initial instant $t_{0(m)}$ to a next instant $t_{0(m+1)}$ (excluded) which is the initial instant of the next time slot $ts_{m+1}$, or:

$$ts_m = [t_{0(m)}, t_{0(m+1)}).$$

Anyway, embodiments of the present invention featuring overlapping time slots are not excluded. Also, the time slots $ts_m$ into which the observation period is subdivided may have different lengths from one another.

Figure 9:
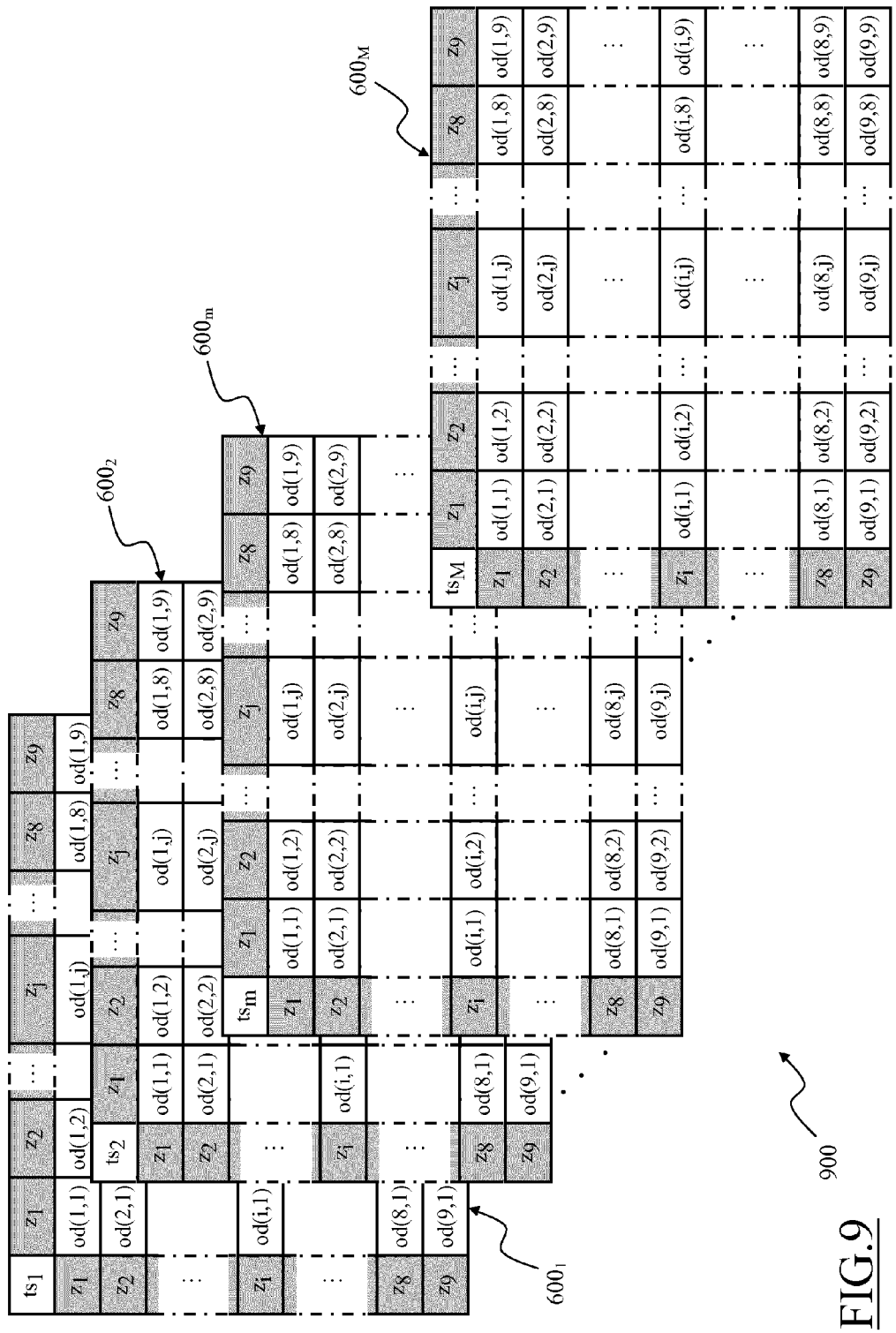
FIG. 9 shows a set of O-D matrices, of the type shown in FIG. 6, each referred to a respective one of a plurality of time slots making up the observation period, and used for performing a traffic analysis.

For each one of the time slots $ts_m$ a respective O-D matrix 600m is computed that accounts for the movements that have taken place during the time slot $ts_m$. Therefore, a sequence or O-D set 900 of M O-D matrices 600m, as shown in FIG. 9, is obtained that provides information of movements of people from/to each one of the different zones $z_q$ of the RoI 500.

The computing of the O-D matrices 600m is now described.

For any pair of consecutive event records $er_v$ and $er_{v+1}$ of a same UE recorded at two subsequent event times $t_k$ and $t_{k-1}$ within the observation period TP and at two distinct locations $p_k$ and $p_{k+1}$ each one associated with a respective zones $z_i$ and $z_j$, a movement of the UE owner is identified.

If both the event times $t_k$ and $t_{k+1}$ belong to a same time slot $ts_m$ of the observation period the entry od(i,j) of the O-D matrix 600m of the set of O-D matrices associated with the time slot $ts_m$ is increased by one unit, i.e. the movement is associated with the O-D matrix 600m.

Conversely, if the event times $t_k$ and $t_{k+1}$ belong to different time slots $ts_m$ and $ts_{m+1}$ substantially three possible options are available for assigning values to the entries od(i,j) in computing the O-D matrices 600m:

1. the entry od(i,j) of the O-D matrix 600m, of the set 900 of O-D matrices, associated with the time slot $ts_m$ is increased by one unit, i.e. the movement is associated with the O-D matrix 600m;

2. the entry od(i,j) of the O-D matrix 600m+1, of the set 900 of O-D matrices, associated with the time slot $ts_{m+1}$ is increased by one unit, i.e. the movement is associated with the O-D matrix 600m+1 or 3. the movement may be distributed between each one of the matrices 600m-600m+x of the set 900 associated with each one of the time slots $ts_m$-$ts_{m-x}$ (where x≥1) comprising at least partially a movement time interval $[t_k, t_{k+1}]$ defined by the event times $t_k$ and $t_{k+1}$. (i.e., the event time $t_k$ occurring during the time slot $ts_m$ and the event time $t_{k+1}$ occurring during the time slot $ts_{m+x}$). Preferably, the movement is associated in a proportional manner to each one of the time slots $ts_m$-$ts_{m+x}$, and consequently assigned to the corresponding matrices 600m-600m+x, according to a (time) portion of the movement time interval $[t_k, t_{k+1}]$ having taken place during each one of the time slots $ts_m$-$ts_{m+x}$.

For example, considering two consecutive time slots $ts_m$ and $ts_{m+1}$ comprising the movement time interval $[t_k, t_{k+1}]$, a first (time) portion of the movement time interval $[t_k, t_{k+1}]$, e.g. 60% of $[t_k, t_{k-1}]$, falls in the time slot $ts_m$ while the second (time) portion of the movement time interval $[t_k, t_{k-1}]$, e.g. the remaining 40% of $[t_k, t_{k+1}]$, falls in the other time slot $ts_{m+1}$, the entry od(i,j) of the O-D matrix 600m is increased by 0.6, while the entry od(i,j) of the other O-D matrix 600m+1 is increased by 0.4.

The first option privileges the initial time ($t_k$) at which a movement is started, the second option privileges instead the final time ($t_{k+1}$) of the movement, while the third option considers the duration of the time interval.

Preferably, the administrator of the system 100 through the administrator interface 120 and/or the user of the system 100 through the user interface 125 may choose among the three options according to their needs.

Therefore, an origin set, or O set, of a plurality of O matrices 700 may be extracted from the O-D set 900 of O-D matrices 600, i.e. one O matrix 700 for each one of the M O-D matrices 600 of the O-D set 900. Similarly, a destination set, or D set, of a plurality of D matrices 800 may be extracted from the O-D set 900 of O-D matrices 600, i.e. one D matrix 800 for each one of the M O-D matrices 600 of the O-D set 900.

More preferably, in the embodiment of the present invention, the observation time period TP of the traffic analysis may be subdivided into two (possibly at least partially overlapped) observation sub-periods, namely an origin observation sub-period OsP and a destination observation sub-period DsP.

The origin observation sub-period OsP is a sub-period of the observation time period TP preferably starting before the start time Ts of the generic public happening S and useful for the analysis of people moving towards the AoI 107 as described in the following.

For example, given the observation time interval [Ts, Te], the origin observation sub-period OsP precedes the start time Ts of the observation time interval [Ts, Te] by an origin time range Ho and ends at the end time Te of the observation time interval [Ts, Te] (i.e., OsP=[Ts−Ho, Te]).

The destination observation sub-period DsP is a sub-period of the observation time period TP preferably starting at the start time Ts of the generic public happening S and useful for the analysis of people leaving the AoI 107 as described in the following.

For example, given the observation time interval [Ts, Te], the destination observation sub-period DsP starts at the start time Ts of the observation time interval [Ts, Te] and ends after a destination time range Hd following the end time Te of the observation time interval [Ts, Te] (i.e., DsP=[Ts, Te+Hd]).

Advantageously, the origin time range Ho and the destination time range Hd are set according to the relevance of the generic public happening S with which are associated. For example, for a generic public happening of local relevance the origin time range Ho and the destination time range Hd may be set to respective values (generally different one from the other) comprised between 2 to 6 hours, while in case of a generic public happening having an international relevance the origin time range Ho and the destination time range Hd may exceed 24 hours.

In addition, the origin time range Ho and the destination time range Hd and/or the origin observation sub-period OsP and the destination observation sub-period DsP may be adjusted by the administrator of the system 100 through the administrator interface 120 and/or by the user through the user interface 125 according to any specific requirements.

Each one of the observation sub-period OsP and the destination observation sub-period DsP may comprise a respective number of time slots $ts_m$ of the observation period TP.

In the considered example, the origin observation sub-period OsP of the observation period TP comprises six (origin) time slots $ts_{m'}$ (e.g., 1≤m'≤6=M'). Advantageously, each time slot $ts_{m'}$ has a respective length that is inversely proportional to an expected people flow inTensity (i.e. proportional to a number of expected movements towards the AoI 107 in that time slot $ts_{m'}$, e.g., the expected traffic density may be based on previous traffic analysis or estimation). For example, time slots having low expected traffic inTensity (i.e., time slots farthest from the observation time interval [Ts, Te]), may be set to be 2 hours long, time slots having mid expected traffic inTensity may be set to be 1 hours long and time slots having high expected traffic inTensity (i.e., time slots closest to the observation time interval [Ts, Te]) may be set to be 0.5 hours long.

Therefore, by considering the origin observation sub-period OsP for which the origin time range Ho is, e.g., 5 hours long (Ho=5 hr), the origin observation sub-period OsP comprises six time slots $ts_{m'}$ having the following structure: $ts_1$=[Ts−5, Ts−3), $ts_2$=[Ts−3, Ts−2), $ts_3$=[Ts−2, Ts−1), $ts_4$=[Ts−1, Ts−0.5), $ts_5$=[Ts−0.5, Ts] and $ts_6$=[Ts, Te]. The last time slot $ts_6$ of the origin observation sub-period OsP corresponds to the observation time interval [Ts, Te] selected for the generic public happening S and takes into account for movements taking place during the observation time interval [Ts, Te], which may be larger than the official duration of the generic public happening S as described above.

Similarly, in the considered example, the destination sub-period DsP of the observation period TP comprises three (destination) time slots $ts_{m''}$ (e.g., 1≤m''≤3=M''). As in the previous case, each time slot $ts_{m''}$ has a respective length that is inversely proportional to an expected people flow inTensity in that time slot $ts_m$.

Therefore, by considering the destination observation sub-period DsP for which the destination time range Hd is, e.g., 3 hours long (Hd=3 hr), the destination observation sub-period DsP comprises three time slots $ts_m''$ having the following structure: $ts_1$=[Ts, Te), $ts_2$=[Te, Te+1), $ts_3$=[Te+1, Te+3). The first time slot $ts_1$ of the destination observation sub-period OsP corresponds to the observation time interval [Ts, Te] selected for the generic public happening S and takes into account for movements taking place during the observation time interval [Ts, Te], which may be larger than the official duration of the generic public happening S.

Anyway, it is pointed out that the solution according to embodiments of the present invention is independent from criteria applied for partitioning the observation period into time slots.

It should be noted that generally the number of (origin) time slots $ts_{m'}$ and (destination) time slots $ts_{m''}$ of the origin observation sub-period OsP and of the destination observation sub-period DsP, respectively, may differ one from the other (as in the example of above), may overlap completely or partially.

Preferably, the number and time exTent of the time slots $ts_{m'}$ comprised into the origin observation sub-period OsP and the time slots $ts_{m''}$ comprised into the destination observation sub-period DsP may be adjusted by the administrator of the system 100 through the administrator interface 120 and/or by the user through the user interface 125 according to any specific requirements.

Figure 10:
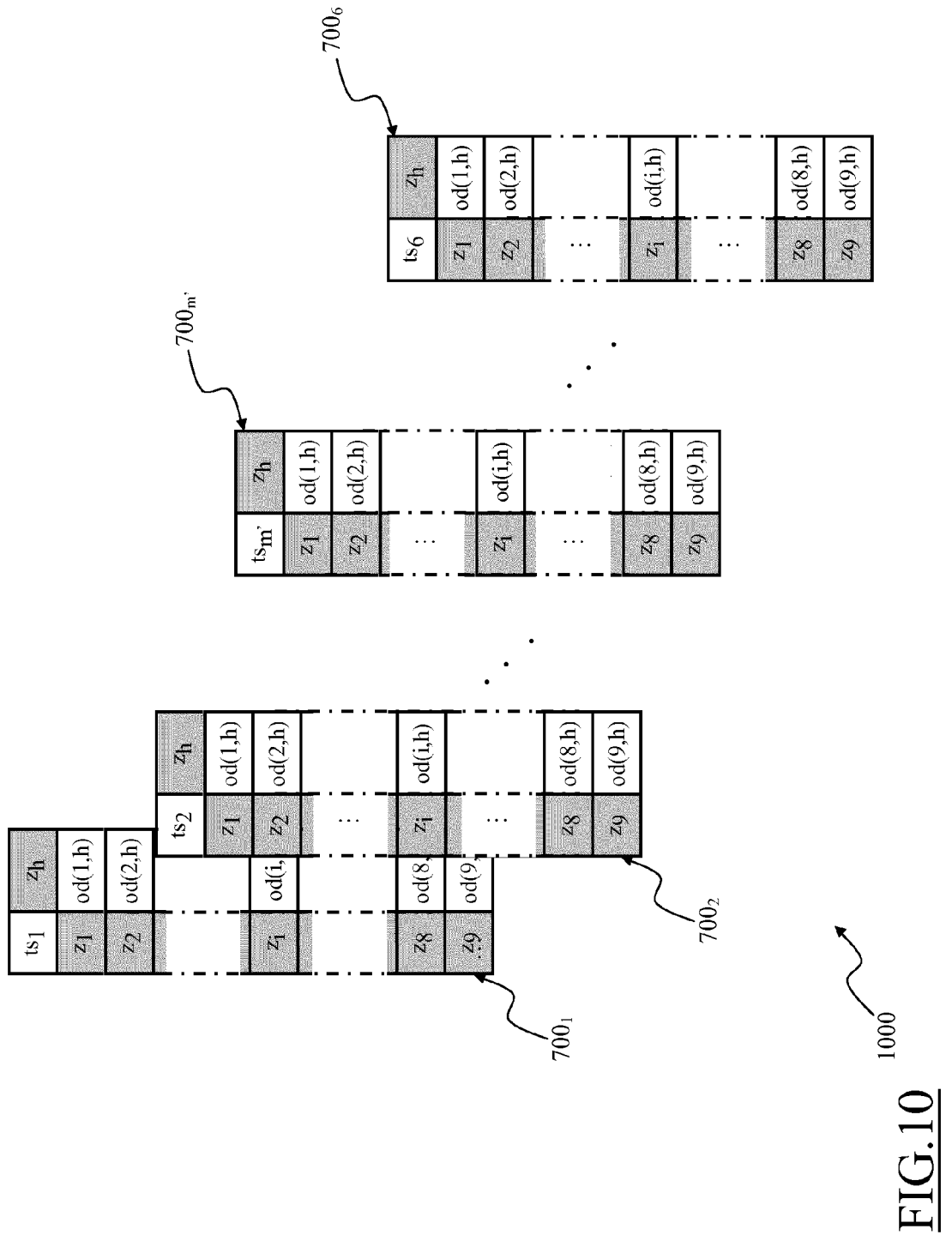
FIG. 10 shows a set of Origin matrices, of the type shown in FIG. 7, corresponding to a respective plurality of time slots making up the observation period, and used for performing the traffic analysis.

Considering FIG. 10, it shows a set 1000 of O matrix 700m' of the type of the O matrices 700 described with respect to FIG. 7 referred to the RoI 500 and to a generic public happening S held in the zone $z_h$, wherein any one of the O matrices 700m' of the set 1000 is calculated for a corresponding (origin) time slot $ts_{m'}$ of the plurality of time slots comprised into the origin observation sub-period OsP.

In the considered example, the set 1000 of O matrices 700m', comprises six O matrices 700$_1$-700$_6$, each one referred to a corresponding one time slot $ts_1$-$ts_6$ comprised in the origin observation sub-period OsP.

The set 1000 of O matrices 700m' accounts for the flows of people towards (i.e., movements ended at) the AoI 107 during the origin observation sub-period OsP which is the observation period within which people that attended at the show gathered at the AoI 107.

Figure 11:
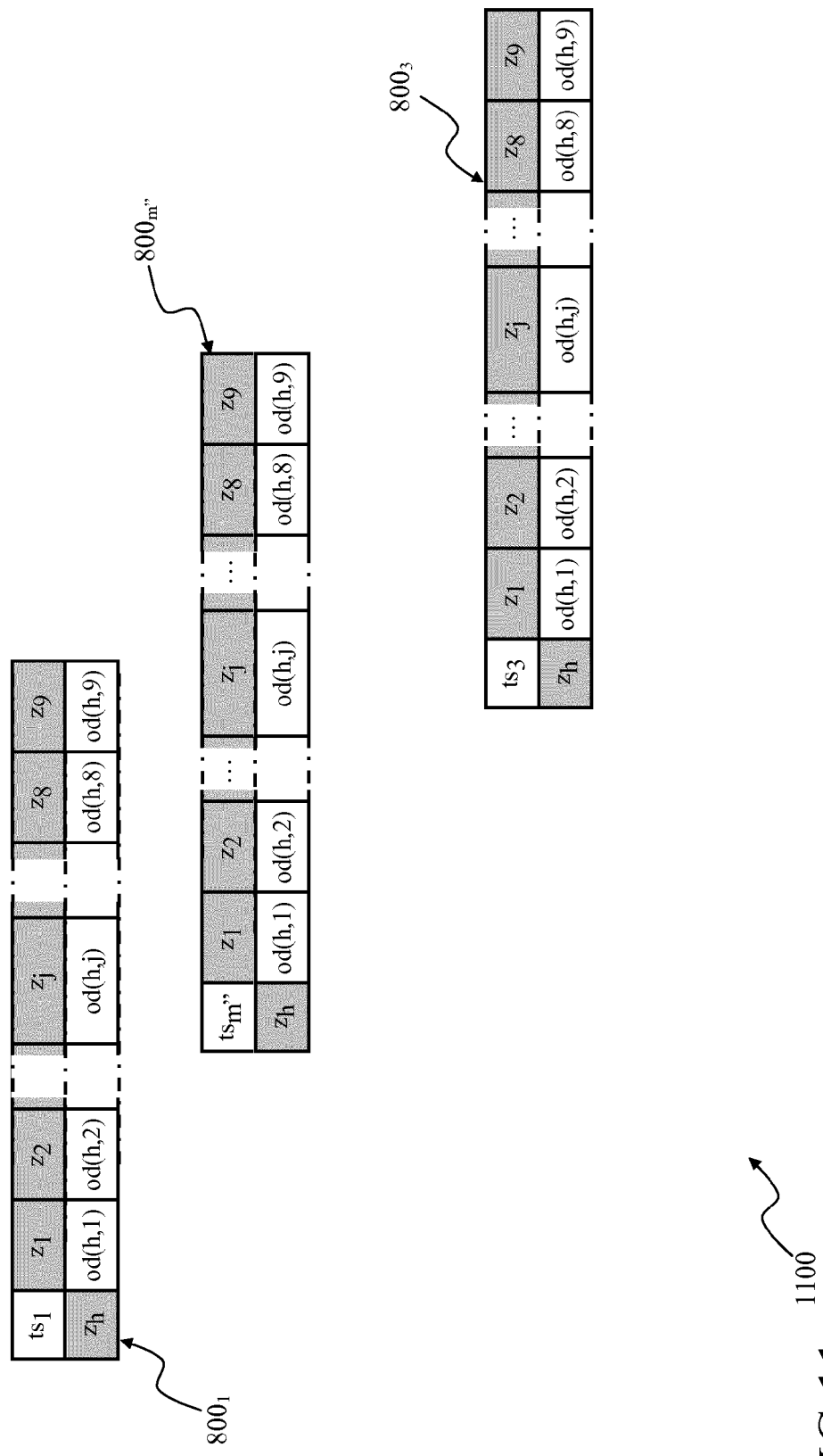
FIG. 11 shows a set of Destination matrices, of the type shown in FIG. 8, corresponding to a respective plurality of time slots making up the observation period, and used for performing the traffic analysis.
Figure 12A:
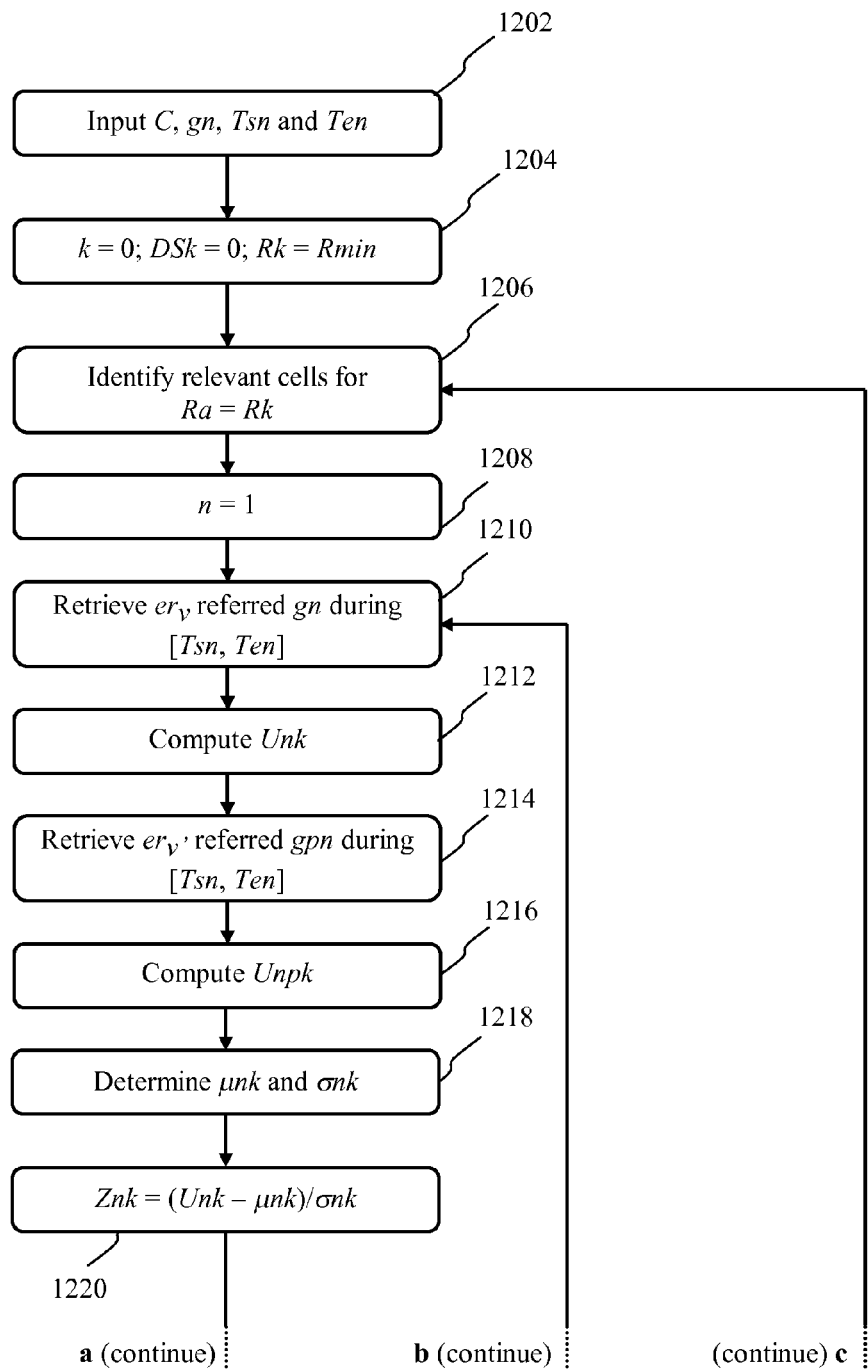
FIGS. 12A-12G are a schematic flowchart of an algorithm for identifying movements and O-D matrices computation referred to one or more public happenings according to an embodiment of the present invention.
Figure 12B:
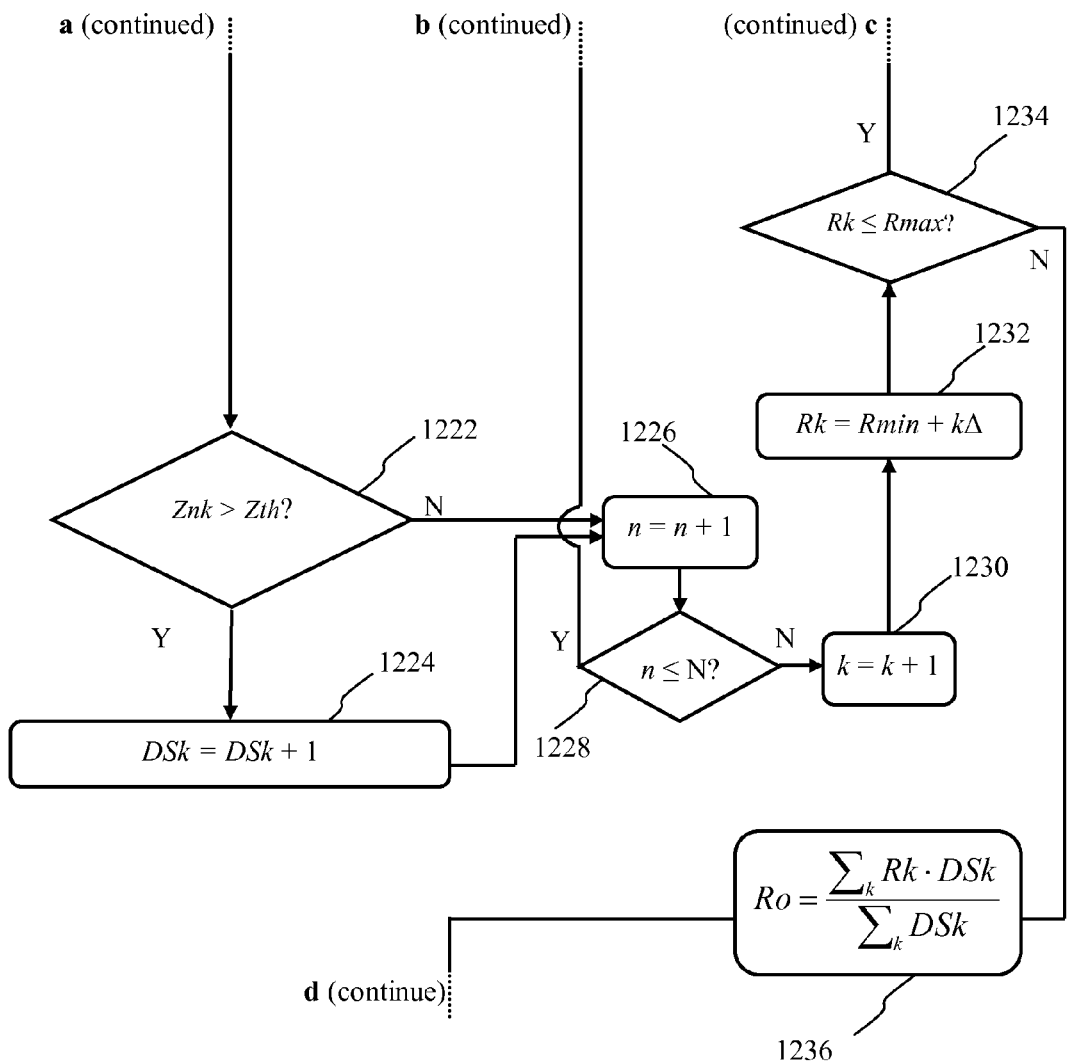
Figure 12C:
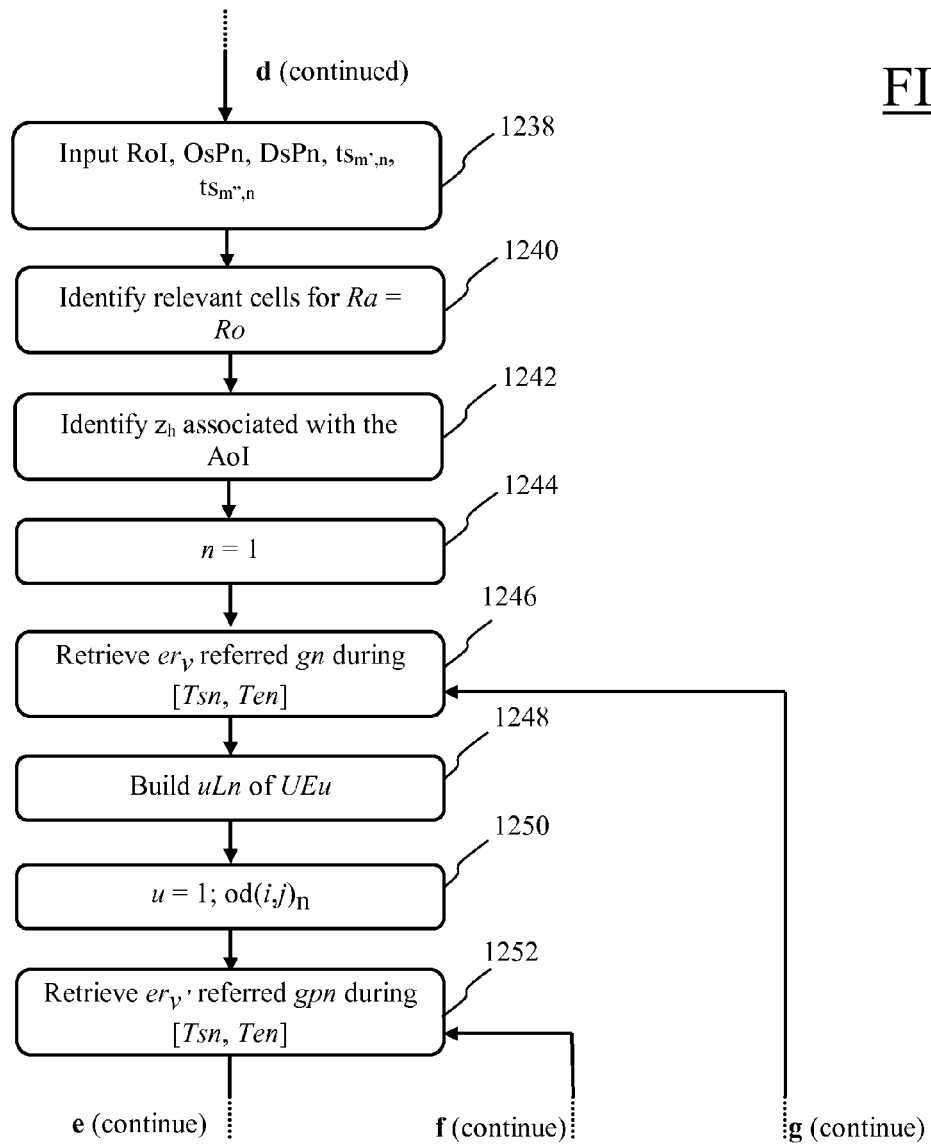
Figure 12D:
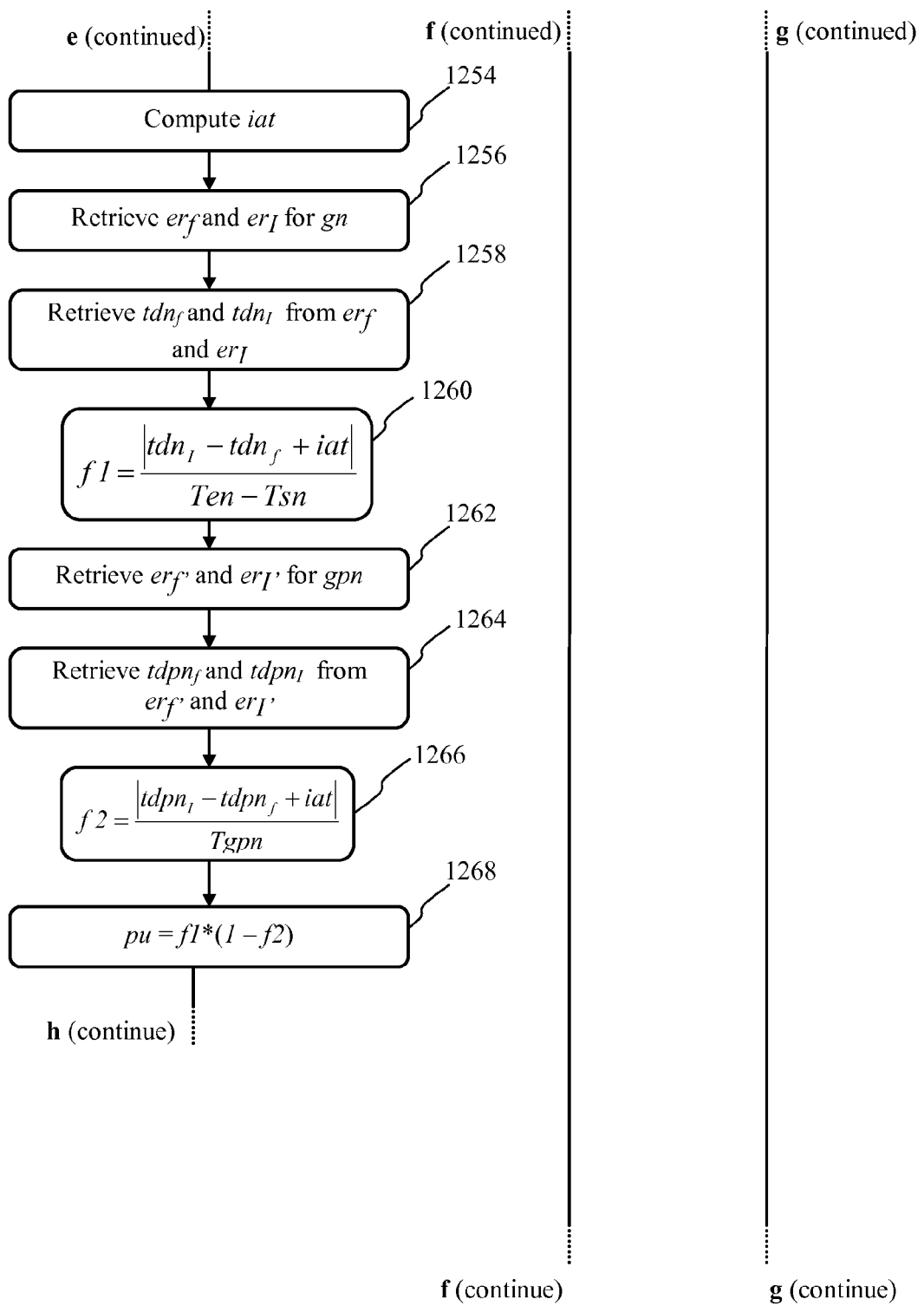
Figure 12E:
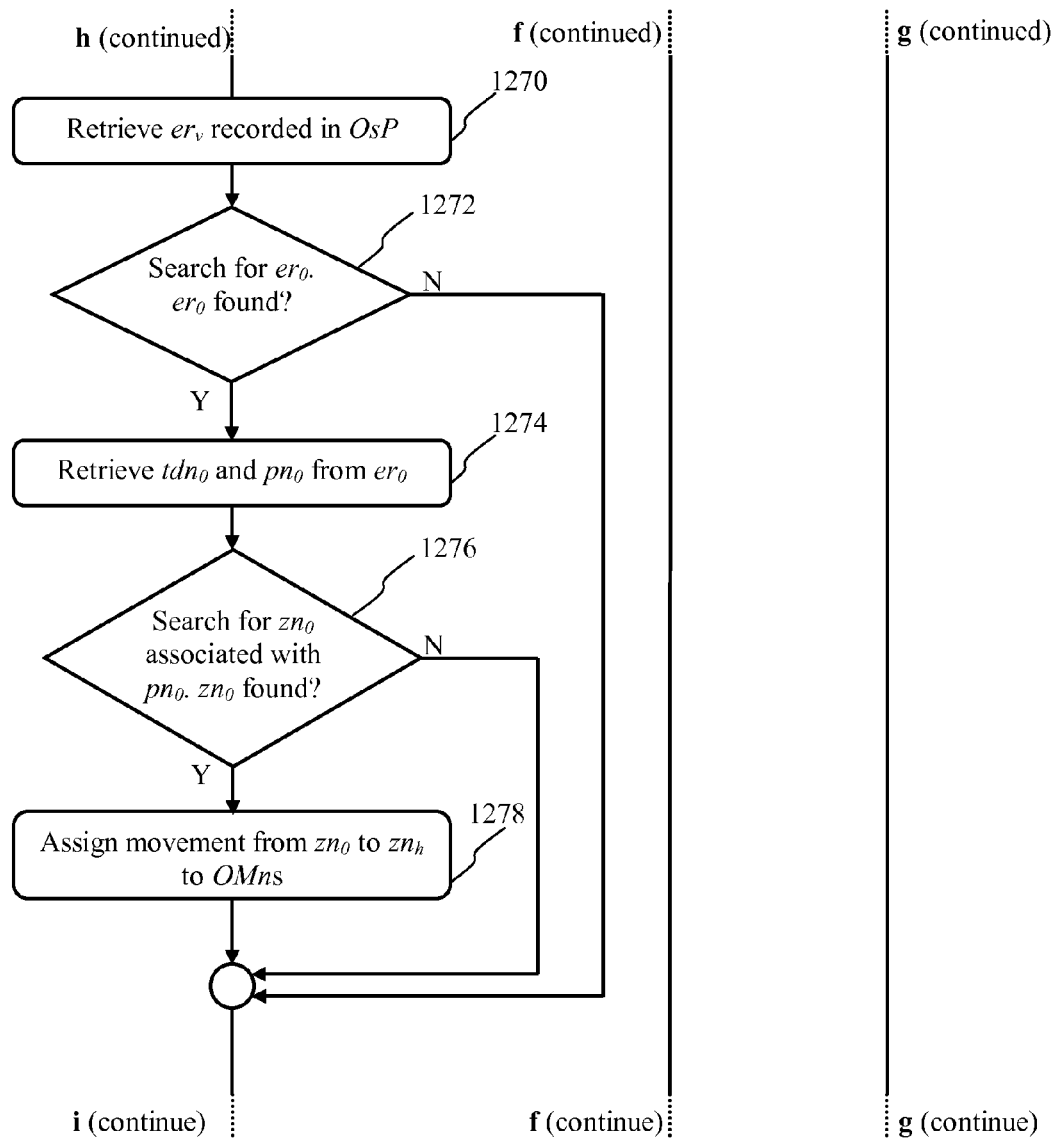
Figure 12F:
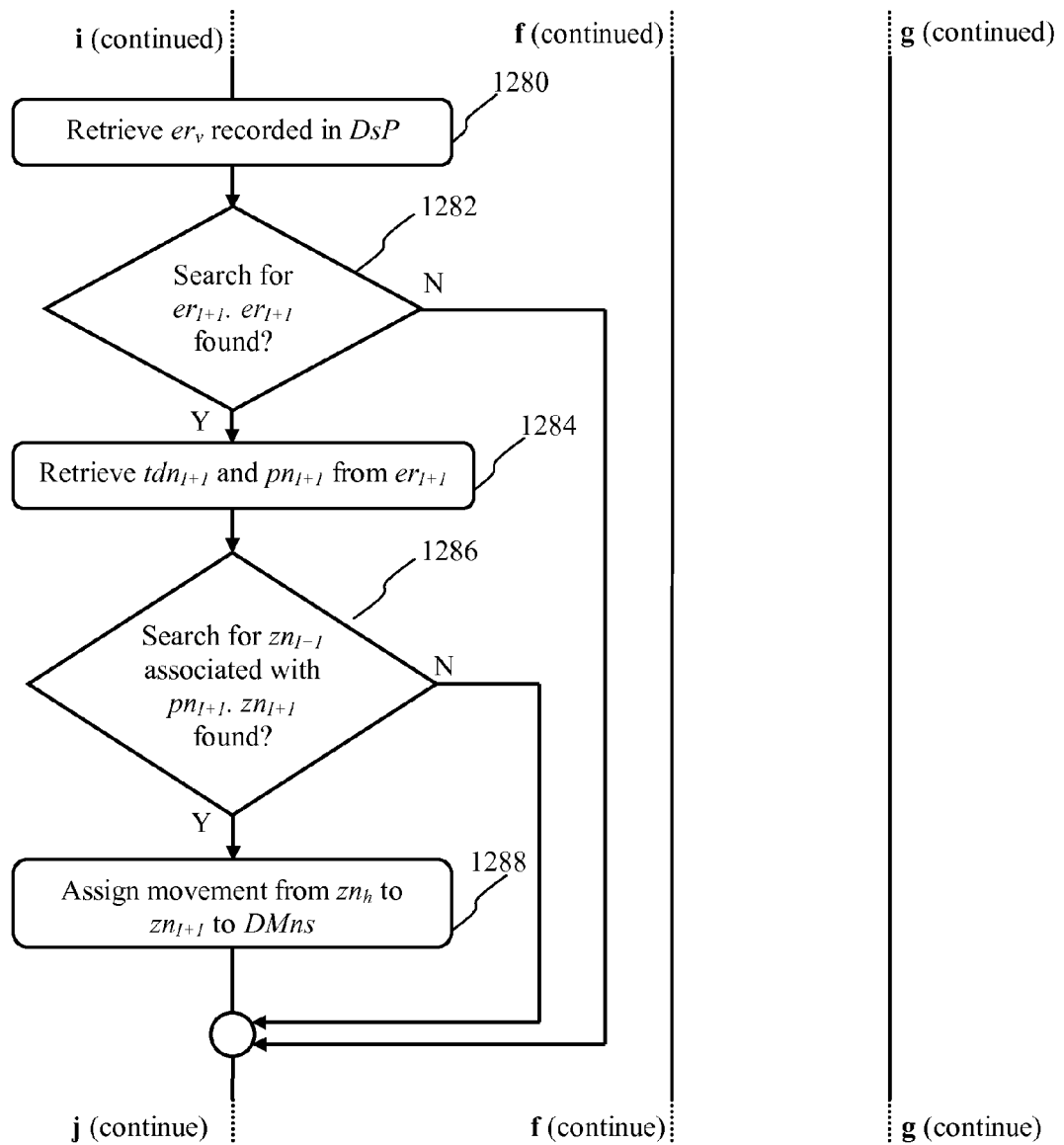
Figure 12G:
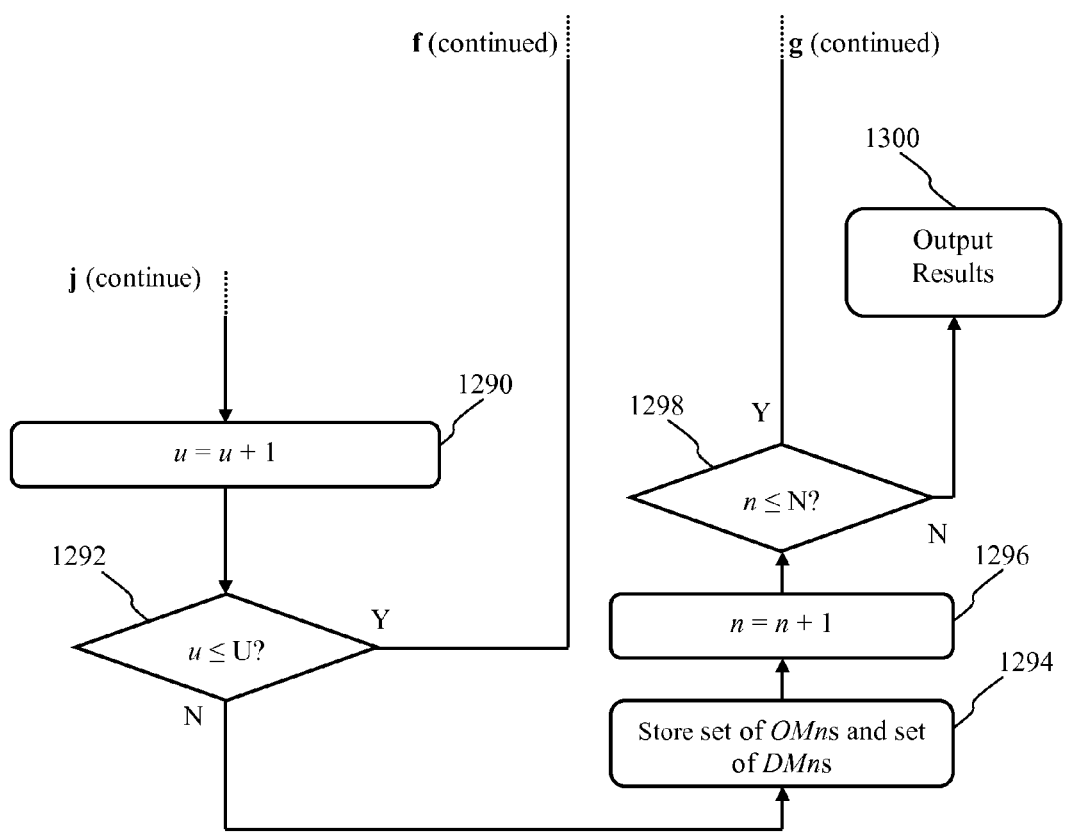

Considering FIG. 11, it shows a set 1100 of D matrices 800m'' of the type of the D matrices 800 described with respect to FIG. 8 referred to the RoI 500 and to a generic public happening S held in the zone $z_h$, wherein any one of the D matrices 800m'' of the set 1100 is calculated for a corresponding (destination) time slot $ts_{m''}$ comprised into the destination observation sub-period DsP.

The set 1100 of D matrices 800m'' accounts for the flows of people leaving (i.e., movements started from) the AoI 107 during the destination observation sub-period DsP which is the observation period within which people that attended at the show left the AoI 107.

Having described the system 100, time (i.e., the start time Ts and the end time Te) and spatial (i.e., the AoI center C and AoI radius Ra of the AoI 107) characteristics of a generic public happening S, the structure of a set 900 of O-D matrices 600m of the movements related to the generic public happening S, and the set 1000 of O matrices 700m' and the set 1100 of D matrices 800m'' derived from the O-D matrices 600m, an algorithm for identifying and analyzing the traffic flows of people that attended the one or more public happenings Sn (i.e., for identifying and analyzing movements and computing O matrices and D matrices (or O-D matrices) related to people that attended one or more public happenings Sn) according to an embodiment of the present invention will be now described, by making reference to FIGS. 12A-12G, which are a schematic block diagram thereof.

Let N (where N is an integer number, that may be defined by the administrator through the administrator interface 120 and/or by the user through the user interface 125) be a number of public happenings Sn, where n is a happening variable indicating which of the N public happenings is considered (i.e., $1 \leq n \leq N$), held in a same AoI 107 and of which the movements within the RoI 500 of people that attended to one or more of the public happenings Sn (i.e., the traffic flow of only those people that have actually attended one or more of the public happenings Sn) is to be analyzed.

For each public happening Sn, an observation day gn during which the public happening Sn has been held, the start time Tsn and the end time Ten are defined. It should be noted that the start time Tsn and the end time Ten may vary from one public happening Sn to the other.

Moreover, for each public happening Sn a set of previous days gpn (where $1 \leq p \leq P$ and P is an integer number) preceding the observation day gn are considered. The number P of previous days gpn considered is preferably set by the administrator (through the administrator interface 120). In an embodiment of the present invention, the administrator sets the number P of previous days gpn according to the storage capabilities of the repository 115 (i.e., in order to be able to store all the data regarding the P previous days gpn) and/or on the basis of computational capabilities of the computation engine 110 (i.e., in order to be able to process all the data regarding the P previous days gpn). Preferably, the administrator sets the number P of previous days gpn also on the basis of a statistical analysis of past public happenings of the same kind (i.e., cultural, entertaining, politics or sport shows).

The Applicant has found that setting the number P of previous days gpn equal to 6 (i.e., P=6) provides good results for most kind of public happenings (although this should not be construed as limitative for the present invention).

A first portion of the algorithm for identifying and analyzing traffic flows of people that attended the one or more public happenings Sn is configured to determine the optimum radius value Ro for the AoI radius Ra of the AoI 107 on the basis of the data regarding all the N public happenings Sn considered.

Initially (step 1202) the AoI center C, the observation days gn and the start times Tsn and end times Ten are inputted to the system 100, e.g. by a user through the user interface 125 or by the administrator through the administrator interface 120.

Afterwards (step 1204), an iteration variable k is initialized to zero (i.e., k=0), a detected number of happening variable DSk is initialized to zero as well (i.e., DSk=0) and a calculated radius value Rk is initially set to the minimum radius value Rmin (i.e., Rk=Rmin). The iteration variable k accounts for the number of iterations of the first portion of the algorithm, the detected number of happening variable DSk accounts for the number of public happenings Sn detected during the iterations of the first portions of the algorithm (as described in the following) and the calculated radius value Rk is used in determining the optimum radius value Ro.

Next (step 1206), the relevant cells 405*a-d* for the AoI 107 having a AoI radius Ra equal to the calculated radius value Rk (Ra=Rk) are identified by means of the inequality (1) as described above.

Afterwards (step 1208), the day variable n is initialized, e.g. to unity (n=1).

All the event records $er_v$ referred to the observation day gn during an observation time interval [Tsn, Ten] and referred to the relevant cell 405*a-d* determined at step 1206 are retrieved (step 1210) from the repository 115.

Subsequently (step 1212), a first UE number Unk is computed as the number of UEs corresponding to (i.e., being associated with) at least one event record $er_v$ among the event records $er_v$ referred to relevant cells 405*a-d* that have been retrieved at previous step 1206 is computed (the first UE number Unk depends on the relevant cells and, therefore, on the calculated radius value Rk).

Similarly, all the event records $er_v$, referred to the previous days gpn during the observation time interval [Tsn, Ten] and having taken place within the relevant cell 405*a-d* determined at step 1206 are retrieved (step 1214) from the repository 115.

Then (step 1216), it is computed a second UE number Upnk for each one of the previous days gpn as the number of UEs corresponding to at least one event record $er_v$, among the event records $er_v$, referred to relevant cells 405*a-d* that have been retrieved at previous step 1206 (the second UE numbers Upnk depends on the relevant cells and, therefore, on the calculated radius value Rk).

The second UE numbers Upnk just computed are combined (step 1218) in order to determine an average UE number μnk (with $$\mu nk = \sum_{p=1}^{P} Upnk$$

and a UE number standard deviation σnk (with $$\sigma nk = \sqrt{\frac{\sum_{p=1}^{P} (Upnk - \mu nk)^2}{P}}$$

of the UE number within the relevant cells 405*a-d* during the observation time interval [Tsn, Ten] on the P previous days gpn considered.

The average UE number μnk and the UE number standard deviation σnk are combined (step 1220) with the first UE number Unk in order to obtain a (statistical) quantity defined z-score Znk (which depends on the calculated radius value Rk):

$$Znk = (Unk - \mu nk)/\sigma nk. \quad (4)$$

The z-score Znk just computed is compared (step 1222) with a z-score threshold Zth and it is checked whether the z-score Znk is greater than the z-score threshold Zth, or:

$$Znk > Zth. \quad (5)$$

The z-score threshold Zth is a value preferably defined by the administrator through the administrator interface 120 on the basis of statistical analysis of past public happenings of the same kind (e.g., cultural, entertaining, politics or sport happenings).

The Applicant has found that setting the z-score threshold Zth equal to 2 (i.e., Zth=2) provides good results for most kind of public happenings (although this should not be construed as limitative for the present invention).

In the affirmative case (exit branch Y of decision block 1222), i.e. the z-score Znk is greater than the z-score threshold Zth (i.e., Znk>Zth), one of the N public happenings Sn is detected and the detected number of happenings variable DSk is increased by unity (step 1224; i.e., DSk=DSk+1) and operation proceeds at step 1226 (described hereinbelow).

In the negative case (exit branch N of decision block 1222), i.e. the z-score Znk is equal to, or lower than, the z-score threshold Zth (i.e., Znk≤Zth), the day variable n is increased by unity (step 1226; i.e., n=n+1).

Then (step 1228), it is checked whether the happening variable n is lower than, or equal to, the number N of public happening Sn:

$$n \leq N. \tag{6}$$

In the affirmative case (exit branch Y of decision block 1228), i.e. the variable n is lower than, or equal to, the number N of overall public happenings Sn (n≤N), operation returns to step 1210 for analyzing the event records $er_v$ referred to the public happening Sn held on the next observation day gn.

In the negative case (exit branch N of decision block 1228), i.e. the happening variable n is greater than the number N of overall public happenings Sn (n>N; i.e., all the N public happenings Sn have been analyzed), the variable k is increased by unity (step 1230; i.e., k=k+1) and the calculated radius value Rk is increased (step 1232):

$$Rk = R\min + k\Delta, \tag{7}$$

where Δ is an iteration width that may be defined by the administrator (e.g., Δ=100 m), thus each calculated radius value Rk is separated from the next calculated radius value by an iteration width Δ. It should be noted that the iteration width Δ defines a maximum iteration value kmax for the iteration variable k—and, therefore, a maximum number of iterations for determining the optimum radius value Ro—as:

$$k\max = (|R\min| + R\max)/\Delta. \tag{8}$$

It should be noted that the iteration width Δ may be used by the system administrator to adjust a granularity (i.e., fineness) with which the optimum radius value Ro is determined, i.e. the smaller the iteration width Δ set by the administrator the higher the number of iterations defined by the maximum iteration value kmax and, thus, the finer a granularity of the algorithm for identifying and analyzing traffic flows of people that attended the one or more public happenings Sn.

In an embodiment of the present invention, since the minimum radius value Rmin is set to −1500 m, the maximum radius value Rmax is set to 1500 m and the iteration width Δ is set to 100 m the maximum iteration value kmax for the iteration variable k results to be equal to 30 and, therefore, the maximum number of iterations for determining the optimum radius value Ro is limited to 30.

Afterwards, it is checked (step 1234) whether the calculated radius value Rk is lower than, or equal to, the maximum radius value Rmax:

$$Rk \leq R\max. \tag{9}$$

In the affirmative case (exit branch Y of decision block 1234), i.e. the calculated radius value Rk is lower than, or equal to, the maximum radius value Rmax (i.e., Rk≤Rmax) operation returns to step 1206 for starting a new iteration of the first portion of the algorithm based on the calculated radius value Rk just increased (at step 1232) by a further k-th iteration width Δ.

In the negative case (exit branch N of decision block 1234), i.e. the calculated radius value Rk is greater than the maximum radius value Rmax (i.e., Rk>Rmax), the optimum radius value Ro is computed (step 1236) as the average of the computed radius values Rk (with 1≤k≤kmax) weighted by the number DSk of detected public happening Sn within the AoI 107 having the AoI radius Ra equal to the same computed radius values Rk, i.e. the detected number of happening variable DSk, or:

$$Ro = \frac{\sum_k Rk \cdot DSk}{\sum_k DSk}. \tag{10}$$

The steps 1206 to 1234 of the first portion of the algorithm for identifying and analyzing traffic flows of people that attended the one or more public happenings Sn are iterated until the calculated radius value Rk is greater than the maximum radius value Rmax (i.e., Rk>Rmax), and the optimum radius value Ro is computed (at step 1236).

With the computation of the optimum radius value Ro at step 1236 the first portion of the algorithm for identifying and analyzing traffic flows of people that attended the one or more public happenings Sn ends and then a second portion of the algorithm for identifying and analyzing traffic flows of people that attended the one or more public happenings Sn starts (at step 1238, described in the following). At the end of the first portion of the algorithm for identifying and analyzing traffic flows of people that attended the one or more public happenings Sn, the AoI 107 is properly defined by the AoI center C and by the AoI radius Ra set equal to the optimum radius value Ro (Ra=Ro).

The second portion of the algorithm for identifying and analyzing traffic flows of people that attended the one or more public happenings Sn according to an embodiment of the present invention is configured for identifying the movements and computing O matrices and D matrices (or O-D matrices) related to people that attended one or more public happenings Sn.

Initially (step 1238) in the system 100, e.g. by a user through the user interface 125 or by the administrator through the administrator interface 120, the RoI 500 (with the zones $z_q$ by which it is defined), an origin observation sub-period OsPn for each one of the one or more public happenings Sn and a destination observation sub-period DsPn for each one of the one or more public happenings Sn together with the respective (origin) time slots $ts_{m',n}$ and (destination) time slots $ts_{m'',n}$ are defined. Possibly, also the option (described above) for assigning the movements in the sets 1000 and 1100 of O/D matrices 700m' and 800m", respectively, is selected. In other words, for each one of the one or more public happenings Sn a respective observation time period TPn may be defined, such observation time period TPn comprises the origin observation sub-period OsPn and the destination observation sub-period DsPn mentioned above.

In other embodiment of the invention, the step 1238 just described may be included in the previously described step 1202, in order to reduce a data entry phase to a single (initial) step.

After the optimum radius value Ro has been computed at step 1236, a set of actually relevant cells 405a-d is defined (step 1240). This set includes all the cells 105b of the mobile communication network 105 for which inequality (1) is verified when the AoI radius Ra is set equal to the optimum radius value Ro, or:

$$\mathrm{Dist}(C,B) \leq |Rc + Ro|. \tag{11}$$

Next (step 1242), the AoI 107 is associated with one (in the considered example) of the Q zones $z_q$ of the RoI 500, i.e. the happening zone $z_h$. Preferably, the happening zone $z_h$ is selected as the zone $z_q$ of the RoI 500 which comprises the AoI center C. Alternatively, the happening zone $z_h$ is the zone $z_q$ of the RoI 500 which comprises at least a selected portion of the AoI 107 (e.g., a portion greater than the 50% of the AoI 107 with Ra=Ro).

Then (step 1244), the happening variable n is initialized to unity (n=1) and all the event records $er_v$ referred to the observation day gn during the observation time interval [Ts, Te] and having taken place within the actually relevant cells 405a-d determined at step 1240 are retrieved (step 1246) from the repository 115.

Subsequently (step 1248), a UE list uLn is built. The UE list uLn comprises an identifier of each user corresponding to at least one event record $er_v$ among the event records $er_v$ referred to relevant cells that have been retrieved at previous step 1246.

Once the UE list uLn has been built, a UE variable u is initialized to unity (i.e., u=1) and the O matrices $700m',n$ of the O set $1000n$, i.e. referred to the n-th public happening Sn, and the D matrices $800m'',n$ of the D set $1100n$, i.e. referred to the n-th public happening Sn, are built with all the respective entries od(i,j) set to zero (step 1250). The UE variable u is used for scanning all the user comprised in the UE list uLn.

All the event records $er_{v'}$ referred to a UE UEu recorded in each one of the previous days gpn during observation time interval [Tsn, Ten] and having taken place within any one of the cells 105b of the mobile communication network 105 are retrieved (step 1252) from the repository 115.

Then (step 1254), an average intermediate arrival time iat between consecutive event records $er_v$ is computed for the UE UEu. In one embodiment of the invention, intermediate arrival times for the UE UEu are computed as the difference between time data (i.e., timestamps) of two consecutive event records $er_v$. Preferably, the average intermediate arrival time iat is computed on the basis of event records $er_v$ and $er_{v'}$ recorded during the observation day gn retrieved at step 1246 and the P previous days gpn retrieved at step 1252.

A first event record $er_f$ and a last event record $er_l$ referred to the observation day gn during the observation time interval [Tsn, Ten] and having taken place within the actually relevant cells 405a-d determined at step 1240 are identified for the UE UEu (step 1256) and a respective first observation time data $tdn_f$ and last observation time data $tdn_l$ are retrieved (step 1258) therefrom.

The first observation time data $tdn_f$, the last observation time data $tdn_l$ and the average intermediate arrival time iat are combined (step 1260) in order to determine a first time fraction f1 that the UE UEu has spent within the AoI 107 during the observation day gn during the observation time interval [Tsn, Ten]:

$$f1 = \frac{|tdn_l - tdn_f + iat|}{Ten - Tsn} \quad (12)$$

Subsequently, a first event record $er_{f'}$ and a last event record $er_{l'}$ among all the event records $er_{v'}$ referred to the P previous days gpn during the observation time interval [Tsn, Ten] and having taken place within the actually relevant cells 405a-d determined at step 1240 are identified for the UE UEu (step 1262) and a respective first previous time data $tdpn_f$ and last previous time data $tdpn_l$ are retrieved (step 1264) therefrom.

The first previous time data $tdpn_f$, the last previous time data $tdpn_l$ and the average intermediate arrival time iat are combined (step 1266) in order to determine a second time fraction f2 that the UE UEu has spent within the AoI 107 during the P previous day gpn:

$$f2 = \frac{|tdpn_l - tdpn_f + iat|}{Tgpn}, \quad (13)$$

where Tgpn is total duration of the P previous days gpn, which may be computed for example in seconds, minutes or hours according to the time unit (i.e., seconds, minutes or hours) used for time quantities (such as for example the first previous time data $tdpn_f$, the last previous time data $tdpn_l$ and the average intermediate arrival time iat) in the algorithm for identifying and analyzing traffic flows of people that attended the one or more public happenings Sn.

Afterwards (step 1268), a person probability pu that the owner of the UE UEu attended at the public happening Sn is computed by combining the first time fraction f1 and the second time fraction f2:

$$pu = f1*(1-f2). \quad (14)$$

Therefore, the first time fraction f1 and the second time fraction f2 may be considered as probabilities. Namely, the first time fraction f1 may be construed as the probability that the owner of the UE UEu has been in the AoI 107 during the public happening Sn, while the second time fraction f2 may be construed as the probability that the owner of the UE UEu has been in the AoI 107 during the previous days gpn.

Next (decision block 1270), the event records $er_v$ recorded during the origin observation sub-period OsPn are considered.

For each UE UEu, it is searched (block 1272) a previous event record $er_0$ directly preceding the first event record $er_f$ in the observation day gn and recorded by a cell 105b of the mobile communication network 105 different from the actually relevant cells 405a-d determined at step 1240 (i.e., outside the AoI 107).

If the previous event record $er_0$ is not found (exit branch N of decision block 1272) the algorithm skips to step 1280 described in the following.

Conversely, if the previous event record $er_0$ is found (exit branch Y of decision block 1272) a previous time data $tdn_0$ and a previous position $pn_0$ associated with the previous event record $er_0$ (step 1274) are retrieved (e.g., from the information contained in the event record $er_0$).

Then (decision block 1276), it is searched for a previous zone $zn_0$, among the zones $z_q$ of the RoI 500, that comprises the previous position $pn_0$ associated with the previous event record $er_0$.

If the previous zone $zn_0$ is not found (exit branch N of decision block 1276) the algorithm skips to step 1280 described in the following.

Conversely, if the previous zone $zn_0$ is found (exit branch Y of decision block 1276) a movement between the previous zone $zn_0$ and the happening zone $zn_h$ is identified (step 1278), provided that the previous zone $zn_0$ is different from the happening zone $zn_h$ ($zn_0 \neq zn_h$). The movement is assigned to the entry od(0, h)$_n$ of the corresponding O matrix $700m',n$ or distributed between a plurality of entries od(0, h)$_n$ of the corresponding O matrices $700m',n$ referred to time slots $ts_{m',n}$ comprised in a movement time interval [$tdn_0$, $tdn_f$] delimited by the previous time data $tdn_0$ and the first time data $tdn_f$ according to the option selected for assigning the identified movements to the O matrices $700m',n$.

Preferably, in the embodiment of the present invention, the entry/entries od(0, h)$_n$ of the corresponding O matrix/ matrices $700m',n$ is not simply increased by one unit or by an amount proportional to the part of each time slot $ts_{m'}$ comprised in the movement time interval $[tdn_0, tdn_I]$, but it is also combined with, e.g. multiplied by, the person probability pu that the owner of the UE UEu attended at the public happening Sn computed at step 1268. In other words the entry/entries $od(0, h)_n$ of the corresponding O matrix/matrices $700m',n$ is the combination, the sum in the considered example, of the person probability pu that the owner of the UE UEu, for which a movement between the previous zone $z_0$ and the happening zone $z_h$ is identified, has also attended the public happening Sn.

In this way, each entries provide a statistical information about as the probability that the owner of the UE UEu, which generated the considered previous event record $er_0$, has moved into the AoI 107 for attending at the public happening Sn.

Next (decision block 1280), the event records $er_y$ recorded during the destination observation sub-period DsPn are considered.

For each UE UEu, it is searched (decision block 1282) a next event record $er_{I+1}$ directly following the last event record $er_I$ in the observation day gn and recorded by a cell 105b of the mobile communication network 105 different from the actually relevant cells 405a-d determined at step 1240 (i.e., outside the AoI 107).

If the previous event record $er_{I+1}$ is not found (exit branch N of decision block 1282) the algorithm skips to step 1290 described in the following.

Conversely, if the next event record $er_{I+1}$ is found (exit branch Y of decision block 1282) a next time data $tdn_{I+1}$ and a next position $pn_{I+1}$ associated with the next event record $er_{I+1}$ (step 1284) are retrieved (e.g., from the information contained in the event record $er_{I+1}$).

Then (decision block 1286), it is searched for a next zone $zn_{I+1}$ among the zones $z_q$ of the RoI 500 that comprises the next position $pn_{I+1}$ associated with the next event record $er_{I+1}$.

If the next zone $zn_{I+1}$ is not found (exit branch N of decision block 1276) the algorithm skips to step 1290 described in the following.

Conversely, if the next zone $zn_{I+1}$ is found (exit branch Y of decision block 1286) a movement between the happening zone $zn_h$ and the next zone $zn_{I+1}$ is identified (step 1288), provided that the next zone $zn_{I+1}$ is different from the happening zone $zn_h$ ($zn_{I+1} \neq zn_h$). The movement is assigned to the entry $od(h, I+1)_n$ of the corresponding D matrix $800m'',n$ or distributed between a plurality of entries $od(h, I+1)_n$ of the corresponding D matrices $800m'',n$ referred to time slots $ts_{m'',n}$ comprised in a movement time interval $[tdn_I, tdn_{I-1}]$ delimited by the last time data $tdn_I$ and the next time data $tdn_{I+1}$ according to the option selected for assigning the identified movements to the D matrices $800m'',n$.

Preferably, in the embodiment of the present invention, the entry/entries $od(h, I+1)_n$ of the corresponding D matrix/matrices $800m'',n$ is not simply increased by unity or by an amount proportional to the part of each time slot $ts_{m'',n}$ comprised in the movement time interval $[tdn_I, tdn_{I+1}]$, but it is also multiplied by the person probability pu that the owner of the UE UEu, which generated the considered next event record $er_{I+1}$, attended at the public happening Sn computed at step 1268. In this way, each entry provide a statistical information about as the probability that the owner of the UE UEu has left the AoI 107 after having attended at the public happening Sn.

Afterwards, the UE variable u is increased by one unit (step 1290; i.e., u=u+1) and it is checked (step 1292) whether UE variable u is lower than, or equal to, a total number of listed UE U (where U is an integer number) listed in the UE list uLn:

$$u \leq U. \tag{16}$$

In the affirmative case (exit branch Y of decision block 1292), i.e. the UE variable u is lower than, or equal to, the number U of listed user (u≤U), the operation returns to step 1252 for analyzing the event records $er_v$ referred to the next UE UEu.

In the negative case (exit branch N of decision block 1292), i.e. the UE variable u is greater than the total number U of listed user (u>U), the UE list uLn has been completely scanned. Therefore, the movements and both the O set 1000n of O matrices $700m',n$ and the D set 1100n of matrices $800m'',n$ referred to the public happening Sn held on the observation day gn are stored (step 1294) in the repository 115, then the day variable n is increased by one unit (step 1296; i.e., n=n+1) and it is checked (step 1298) whether the day variable n is lower than, or equal to, the number N of public happenings Sn (in the same way as done at previous step 1228):

$$n \leq N. \tag{6}$$

In the affirmative case (exit branch Y of decision block 1298), i.e. the happening variable n is lower than, or equal to, the number N of public happenings Sn (n≤N), the algorithm returns to step 1246 in order to analyze the next public happening Sn held on the next happening day gn.

In the negative case (exit branch N of decision block 1298), i.e. the happening variable n is greater than the number N of overall public happenings Sn (n>N), all the N public happenings Sn have been analyzed and thus the crowd estimation algorithm may be terminated.

Preferably, the algorithm is terminated by providing (step 1300) the results, i.e. the N O set 1000n of O matrices $700m',n$ and the N D set 1100n of matrices $800m'',n$, and possibly, the N UE lists uLn and the respective first and second time fractions f1 and f2 for each UE of the UE lists uLn determined at step 1248, to the user through the user terminal 125 for inspection and/or further processing.

The steps 1246 to 1298 of the second portion of the algorithm for identifying and analyzing traffic flows of people that attended at the one or more public happenings Sn are iterated until all the N public happenings Sn have been analyzed and thus the algorithm for identifying and analyzing traffic flows of people that attended at the one or more public happenings Sn is terminated (at step 1300) with the provision of the results to the user through the user terminal 125.

In summary, the algorithm for identifying and analyzing traffic flows of people that attended the one or more public happenings Sn comprises a first portion and a second portion.

In its turn, the first portion of the algorithm for identifying and analyzing traffic flows of people that attended the one or more public happenings Sn comprises two nested cycles. A first external cycle scans (steps 1206-1234) all the computed radius values Rk between the minimum radius value Rmin and the maximum radius value Rmax, while a first internal cycle scans (steps 1210-1228) all the N public happenings Sn to be analyzed. For each computed radius value Rk respective relevant cells 405a-d and z-score Znk are determined. On the basis of such data (i.e., respective relevant cells 405a-d and z-score Znk) the detected happening variable DSk is computed and the optimum radius value Ro is identified. At the end of the first portion of the algorithm for identifying and analyzing traffic flows of people that attended the one or more public happenings Sn, the AoI 107 having the optimum radius value Ro is defined.

The second portion of the algorithm comprises two nested cycles as well. A second external cycle scans (steps 1246-1298) all the N public happening Sn held within the AoI 107, while a second internal cycle scans (steps 1252-1292) all the UE UEu that generated an event record $er_v$ in at least one relevant cell 405*a-d* (i.e., the AoI 107) during the observation time interval [Tsn, Ten] in the observation day gn. For each UE UEu and for each one of the N public happenings Sn, it is determined a probability (i.e., the first time fraction f1) that the UE owner has been within one or more of the relevant cells 405*a-b* comprised within the AoI 107 having the AoI radius Ra equal to the optimum radius value Ro during the observation time interval [Tsn, Ten] on the observation day gn of the public happening Sn and a further probability (i.e., the second time fraction f2) that the UE owner has been within one or more of the relevant cells 405*a-b* comprised within the same AoI 107 during the P previous days gpn. On the basis of the knowledge of this two probabilities (i.e. time fractions f1 and f2) it is determined the probability that the owner of the UE UEu was a person in the crowd that attended at the public happening Sn. Subsequently, the positions in the RoI 500 for each UE UEu whose owner was in the crowd that attended the public happening Sn before and after the observation time interval [Tsn, Ten] on the observation day gn of the public happening Sn and outside the AoI 107 are determined and the O set 1000*n* of O matrices 700*m',n* and the D set 1100*n* of matrices 800*m'',n* are computed accounting for movements to the AoI 107 and from the AoI 107, respectively.

It should be noted that the algorithm described above may undergo several modification, e.g. similar steps with the same functions may substitute several steps or portions thereof, some non-essential steps may be removed, or additional optional steps may be added, the steps may be performed in different order, in parallel or overlapped (at least in part), without departing from the scope of the present invention.

For example in a simplified embodiment of the present invention only a single set between the O set 1000*n* of O matrices 700*m',n* and the D set 1100*n* of matrices 800*m'',n* may be computed in order to determine only one between the flow of people that gathered at the AoI 107 or the flow of people leaving the AoI 107.

In another embodiment of the present invention, all the movement of the UE owners that were in the crowd that attended the public happening Sn may be traced within the RoI 500 during the origin observation sub-period OsPn and during the destination observation sub-period DsPn. In this case, event records preceding the previous event record $er_0$ and following the next event record $er_{I+1}$ will be considered as well. Then also the movements of the UE owners that were in the crowd that attended at the public happening Sn to the previous zone and from the next zones from/to others zones $z_q$ of the RoI during the origin observation sub-period OsPn and during the destination observation sub-period DsPn, respectively, are identified. This can be achieved by sequences of steps substantially equivalent to steps 1270-1278 and steps 1280-1288: for each consecutive event records a movement is identified between the two zones comprising the position indicated in such consecutive event records and corresponding entries of the O/D matrices are increased according to the options selected for assigning values to the entries of the O/D matrices and according to the person probability pu associated with the UE owner of the UE UEu that generated the event records. It should be noted that this leads to compute O matrices and D matrices having the same size of the O-D matrices (i.e., having Q rows, and Q columns), and providing information on the flows of people that attended the one or more shows Sn within the whole RoI 500.

The system 100 for identifying and analyzing traffic flows of people that attended the one or more public happenings Sn according to an embodiment of the present invention allows a posteriori estimation of movements (i.e., traffic flows) of people that attended one or more public happenings Sn in a reliable way and allows properly identifying (by determining the optimum radius value Ro) an effective exTension of the AoI 107 associated with each of the one or more public happenings Sn.

The invention claimed is:

1. A method of estimating flows of persons that gathered at an Area of Interest for attending a public happening during a time interval on a day, wherein said Area of Interest is defined by an Area of Interest center and an Area of Interest radius and is covered by a mobile telecommunication network having a plurality of communication stations each of which is adapted to manage communications of user equipment in one or more served areas in which the mobile telecommunication network is subdivided, the method comprising the steps of:
   a) defining a plurality of calculated radius values of the Area of Interest radius, and, for each calculated radius value:
   b) identifying a first number of user equipment associated with at least one event record of a corresponding event of interaction occurred between the user equipment and the mobile communication network during the time interval on the day within the Area of Interest;
   c) identifying a second number of user equipment associated with at least one event record of a corresponding event of interaction occurred between the user equipment and the mobile communication network during the time interval for each day of a predetermined number of previous days preceding the day within the Area of Interest;
   d) combining the first number of user equipment and the second numbers of user equipment for obtaining a statistical quantity;
   e) detecting the occurrence of the public happening if the statistical quantity reaches a certain threshold;
   f) computing an optimum radius value of the Area of Interest radius as the average of the calculated radius values within which the public happening is detected;
   g) identifying persons that gathered for attending at the public happening within an Area of Interest having the Area of Interest radius equal to the optimum radius values during the time interval on the day within the Area of Interest based on a first time fraction indicating a probability that the user equipment has been in the Area of Interest during the time interval on the day and on a second time fraction indicating that the user equipment has been in the Area of Interest during the previous days for each user equipment identified at step b);
   h) computing at least one matrix accounting for movements of persons identified at step g) within a Region of Interest comprising the Area of Interest to the Area of Interest during at least one observation time period comprising the time interval, and
   i) computing at least one matrix accounting for movements of persons identified at step g) within a Region of Interest comprising the Area of Interest from the Area of Interest during at least one observation time period comprising the time interval.

2. The method according to claim 1, wherein the public happening comprises a plurality of public happenings, the method further comprising the step of:
j) iterating steps b) to e) for each one of the public happenings of the plurality of public happenings, and wherein the step f) of computing an optimum radius value of the Area of Interest radius as the average of the computed radius values within which the public happening is detected, comprises:
computing an optimum radius value of the Area of Interest radius as the average of the computed radius values weighted by a number of detected public happenings within the Area of Interest having the Area of Interest radius equal to the same computed radius values, said number of detected public happenings being the sum of the public happenings determined by iterating step e).

3. The method according to claim 2, wherein the steps h) of computing at least one matrix accounting for movements of persons identified at step g) within a Region of Interest comprising the Area of Interest to the Area of Interest during at least one observation time period comprising the time interval, and i) of computing at least one matrix accounting for movements of persons identified at step g) within a Region of Interest comprising the Area of Interest from the Area of Interest during at least one observation time period comprising the time interval, comprise:
k) subdividing the Region of Interest into at least two zones;
l) associating a first zone of the at least two zones with the Area of Interest, the first zone comprising at least partially the Area of Interest;
m) subdividing the at least one time period into one or more time slots;
n) identifying a number of persons that moved from a second zone of the at least two zones to the first zone comprising at least partially the Area of Interest during each one of the one or more time slots of the at least one observation time period, and
o) identifying a number of persons that moved to the second zone of the at least two zones from the first zone comprising at least partially the Area of Interest during each one of the one or more time slots of the at least one observation time period.

4. The method according to claim 3, wherein the step n) of identifying a number of persons that moved from a second zone of the at least two zones to the first zone comprising at least partially the Area of Interest during each one of the one or more time slots of the at least one observation time period, comprises:
identifying as the second zone the zone of the Region of Interest that comprises a previous position associated with a previous event record of a corresponding previous event of interaction occurred between the user equipment and the mobile communication network during the observation time period on the day within the Region of interest, the previous event record being recorded before a first event record of a corresponding event of interaction occurred between the user equipment and the mobile communication network during the time interval on the day within the Area of Interest.

5. The method according to claim 4, wherein the step n) of identifying a number of persons that moved from a second zone of the at least two zones to the first zone comprising at least partially the Area of Interest during each one of the one or more time slots of the at least one observation time period, further comprises:
p) computing an origin matrix for each one of the one or more time slots in which the at least one time period has been subdivided, each entry of the origin matrix being indicative of the number of persons that, during the corresponding time slot, moved to the first zone comprising at least partially the Area of Interest from the second zone of the at least two zones.

6. The method according to claim 5, wherein the step p) of computing an origin matrix for each one of the one or more time slots in which the at least one time period has been subdivided, each entry of the origin matrix being indicative of the number of persons that, during the corresponding time slot, moved to the first zone comprising at least partially the Area of Interest from the second zone of the at least two zones, comprises:
increasing a value of the entry indicative of persons that moved from the second zone of the at least two zones to the first zone comprising at least partially the Area of Interest of the origin matrix associated with a time slot comprising a previous time data associated with the previous event record.

7. The method according to claim 5, wherein the step p) of computing an origin matrix for each one of the one or more time slots in which the at least one time period has been subdivided, each entry of the origin matrix being indicative of the number of persons that, during the corresponding time slot, moved to the first zone comprising at least partially the Area of Interest from the second zone of the at least two zones, comprises:
increasing a value of the entry indicative of persons that moved from the second zone of the at least two zones to the first zone comprising at least partially the Area of Interest of the origin matrix associated with a time slot comprising a first time data associated with the first event record.

8. The method according to claim 5, wherein the step p) of computing an origin matrix for each one of the one or more time slots in which the at least one time period has been subdivided, each entry of the origin matrix being indicative of the number of persons that, during the corresponding time slot, moved to the first zone comprising at least partially the Area of Interest from the second zone of the at least two zones, comprises:
identifying an origin movement time interval delimited by a previous time data associated with the previous event record of the corresponding previous event and a first time data associated with the first event record of the corresponding first event, and
increasing a value of the entry indicative of persons that moved from the second zone of the at least two zones to the first zone comprising at least partially the Area of Interest of the origin matrices associated with time slots comprised at least partially in the movement time interval.

9. The method according to claim 5, wherein the step o) of identifying a number of persons that moved to the second zone of the at least two zones from the first zone comprising at least partially the Area of Interest during each one of the one or more time slots of the at least one observation time period, comprises:
identifying as the second zone the zone of the Region of Interest that comprises a next position associated with a next event record of a corresponding next event of interaction occurred between the user equipment and the mobile communication network during the observation time period on the day within the Region of interest, the next event record being recorded after a last event record of a corresponding last event of interaction occurred between the user equipment and the mobile communication network during the time interval on the day within the Area of Interest.

10. The method according to claim 9, wherein the step o) of identifying a number of persons that moved to the second zone of the at least two zones from the first zone comprising at least partially the Area of Interest during each one of the one or more time slots of the at least one observation time period, further comprises:
q) computing a destination matrix for each one of the one or more time slots in which the at least one time period has been subdivided, each entry of the destination matrix being indicative of the number of persons that, during the corresponding time slot, moved from the first zone comprising at least partially the Area of Interest to the second zone of the at least two zones.

11. The method according to claim 10, wherein the step q) of computing a destination matrix for each one of the one or more time slots in which the at least one time period has been subdivided, each entry of the destination matrix being indicative of the number of persons that, during the corresponding time slot, moved from the first zone comprising at least partially the Area of Interest to the second zone of the at least two zones, comprises:
increasing a value of the entry indicative of persons that moved to a second zone of the at least two zones from the first zone comprising at least partially the Area of Interest of the destination matrix associated with a time slot comprising a last time data associated with the last event record.

12. The method according to claim 10, wherein the step q) of computing a destination matrix for each one of the one or more time slots in which the at least one time period has been subdivided, each entry of the destination matrix being indicative of the number of persons that, during the corresponding time slot, moved from the first zone comprising at least partially the Area of Interest to the second zone of the at least two zones, comprises:
increasing a value of the entry indicative of persons that moved to a second zone of the at least two zones from the first zone comprising at least partially the Area of Interest of the destination matrix associated with a time slot comprising a next time data associated with the next event record.

13. The method according to claim 10, wherein the step q) of computing a destination matrix for each one of the one or more time slots in which the at least one time period has been subdivided, each entry of the destination matrix being indicative of the number of persons that, during the corresponding time slot, moved from the first zone comprising at least partially the Area of Interest to the second zone of the at least two zones, comprises:
identifying a destination movement time interval delimited by a last time data associated with the last event record of the corresponding last event and a next time data associated with the next event record of the corresponding next event, and
increasing a value of the entry indicative of persons that moved to a second zone of the at least two zones from the first zone comprising at least partially the Area of Interest of the destination matrices associated with time slots at least partially comprised in the destination movement time interval.

14. The method according to claim 3, wherein the step g) of identifying persons that gathered for attending at the public happening within an Area of Interest having the Area of Interest radius equal to the optimum radius values during the time interval on the day within the Area of Interest based on a first time fraction indicating a probability that the user equipment has been in the Area of Interest during the time interval on the day and on a second time fraction indicating a probability that the user equipment has been in the Area of Interest during the previous days for each user equipment identified at step b), comprises
estimating a probability that each person is attending at the public happening, for each person associated with a respective user equipment of the first number identified at step c), based on the first time fraction and the second time fraction.

15. The method according to claim 14, wherein the step n) of identifying a number of persons that moved from a second zone of the at least two zones to the first zone comprising at least partially the Area of Interest during each one of the one or more time slots of the at least one observation time period, further comprises:
computing the number as a combination of the probabilities of each persons that moved from a second zone of the at least two zones to the first zone comprising at least partially the Area of Interest during each one of the one or more time slots of the at least one observation time period is attending at the public happening.

16. The method according to claim 15, wherein the step o) of identifying a number of persons that moved to the second zone of the at least two zones from the first zone comprising at least partially the Area of Interest during each one of the one or more time slots of the at least one observation time period, further comprises:
computing the number as a combination of the probabilities of each persons that moved to the second zone of the at least two zones from the first zone comprising at least partially the Area of Interest during each one of the one or more time slots of the at least one observation time period is attending at the public happening.

17. The method according to claim 3, wherein the step k) of subdividing the Region of Interest into at least two zones, comprises:
subdividing the Region of Interest into a plurality of zones, and
wherein the step n) of identifying a number of persons that moved from a second zone of the at least two zones to the first zone comprising at least partially the Area of Interest during each one of the one or more time slots of the at least one observation time period, further comprises:
identifying a number of persons that moved from each zone of the plurality of zones to the first zone comprising at least partially the Area of Interest during each one of the one or more time slots of the at least one observation time period, and
wherein the step o) of identifying a number of persons that moved to the second zone of the at least two zones from the first zone comprising at least partially the Area of Interest during each one of the one or more time slots of the at least one observation time period, comprises:
identifying a number of persons that moved to each zone of the plurality of zones from the first zone comprising at least partially the Area of Interest during each one of the one or more time slots of the at least one observation time period.

18. The method according to claim 10, further comprising the step of:
- r) iterating steps l) to q) for each one of the public happenings.

19. A system coupled with a wireless telecommunication network for estimating flows of persons that gathered at an Area of Interest, the system comprising:
- a computation engine adapted to process data retrieved from a mobile telephony network;
- a repository adapted to store data regarding interactions between the user equipment and the mobile telephony network, computation results generated by the computation engine and, possibly, any processing data generated by and/or provided to the system, and
- an administrator interface operable for modifying parameters and/or algorithms used by the computation engine and/or accessing data stored in the repository characterized by
- further comprising a memory element storing a software program product configured for implementing the method of claim 1 through the system.

20. The system according to claim 19, further comprising at least one user interface adapted to receive inputs from, and to provide output to a user of the system, the user comprising one or more human beings and/or one or more external computing systems subscriber of the services provided by the system.

\* \* \* \* \*